(12) United States Patent
Endo et al.

(10) Patent No.: US 7,548,035 B2
(45) Date of Patent: Jun. 16, 2009

(54) CONTROL APPARATUS OF ELECTRIC POWER STEERING APPARATUS

(75) Inventors: Shuji Endo, Gunma (JP); Yuho Aoki, Gunma (JP); Hideyuki Kobayashi, Gunma (JP); CaoMinh Ta, Gunma (JP)

(73) Assignees: NSK Ltd., Tokyo (JP); NSK Steering Systems Co., Ltd., Tokyo (JP)

( * ) Notice: Subject to any disclaimer, the term of this patent is extended or adjusted under 35 U.S.C. 154(b) by 583 days.

(21) Appl. No.: 10/579,969

(22) PCT Filed: Nov. 24, 2004

(86) PCT No.: PCT/JP2004/017822

§ 371 (c)(1),
(2), (4) Date: May 23, 2006

(87) PCT Pub. No.: WO2005/055411

PCT Pub. Date: Jun. 16, 2005

(65) Prior Publication Data

US 2007/0090782 A1  Apr. 26, 2007

(30) Foreign Application Priority Data

Nov. 26, 2003 (JP) ............................. 2003-395685
Jan. 9, 2004 (JP) ............................. 2004-003816
Jan. 14, 2004 (JP) ............................. 2004-006278

(51) Int. Cl.
*H02P 7/00* (2006.01)
(52) U.S. Cl. .................. 318/432; 318/434; 318/400.02; 318/400.15; 318/727
(58) Field of Classification Search ................ 318/432, 318/434, 400.02, 400.15, 727
See application file for complete search history.

(56) References Cited

U.S. PATENT DOCUMENTS

| 5,701,066 A * | 12/1997 | Matsuura et al. ............ 318/808 |
| 6,329,781 B1 * | 12/2001 | Matsui et al. ............... 318/717 |
| 6,504,336 B2 * | 1/2003 | Sakamaki ................... 318/727 |
| 6,727,669 B2 * | 4/2004 | Suzuki et al. ............... 318/139 |
| 2008/0018277 A1 * | 1/2008 | Ta et al. .................. 318/400.02 |
| 2008/0211446 A1 * | 9/2008 | Kobayashi .................. 318/611 |

FOREIGN PATENT DOCUMENTS

| JP | 60-2089 A | 1/1985 |
| JP | 7-327381 A | 12/1995 |
| JP | 8-294299 A | 11/1996 |
| JP | 2000-118424 A | 4/2000 |
| JP | 2001-18822 A | 1/2001 |
| JP | 2002-369546 A | 12/2002 |
| JP | 2003-319678 A | 11/2003 |

* cited by examiner

*Primary Examiner*—Lincoln Donovan
*Assistant Examiner*—Erick Glass
(74) *Attorney, Agent, or Firm*—Sughrue Mion, PLLC

(57) ABSTRACT

The invention relates to a control apparatus of an electric power steering apparatus structured such as to apply a steering assist force generated by a n-phase motor to a steering system of a vehicle, the control apparatus is provided with at least (n−1) numbers of current detecting means for detecting a current Im in each of phases of the motor, a current command value calculating means for outputting a current command value Imref in each of the phases, and n numbers of current control means, and the control apparatus executes a current control of each of the phases by the current control means having the current command value Imref in each of the phases and the current Im in each of the phases as an input.

13 Claims, 19 Drawing Sheets

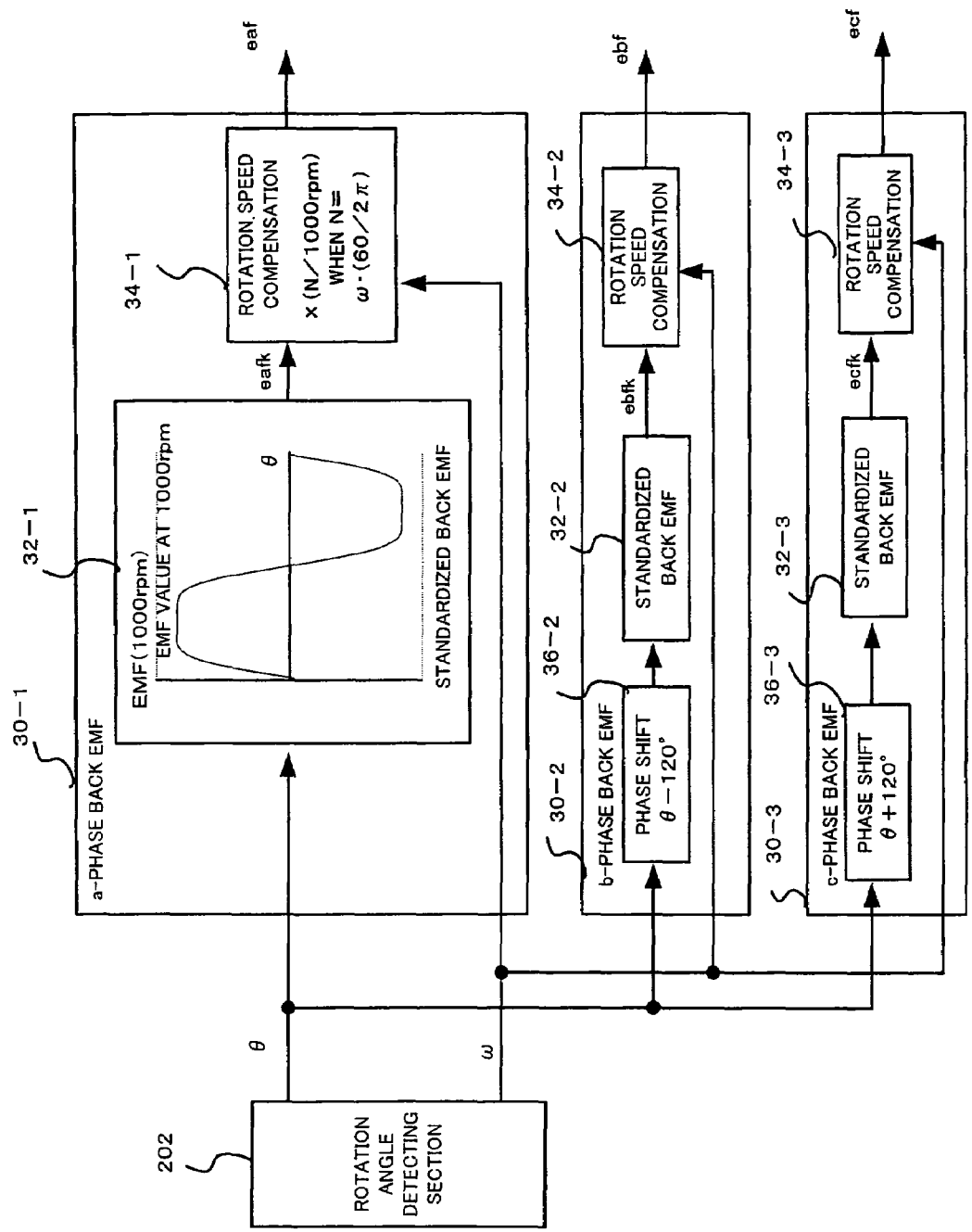

CONTROL APPARATUS OF ELECTRIC POWER STEERING APPARATUS

TECHNICAL FIELD

The present invention relates to a control apparatus of an electric power steering apparatus, and more particularly to a control apparatus of an electric power steering apparatus provided with a motor control function which is a robust control even in the case that a change of a parameter such as a motor parameter or the like corresponding to a controlled subject is generated in a partial phase, attaches an importance to a stability of a control system, and stabilizes a neutral point potential of the motor, in the electric power steering apparatus using a polyphase motor.

BACKGROUND ART

An electric power steering apparatus applying a steering assist force to a steering apparatus of a motor vehicle on the basis of a rotating force of a motor is structured such that the steering assist force is applied to a steering shaft or a rack shaft by applying a driving force of the motor by means of a transmission mechanism such as gears, a belt or the like via a speed reducer. A description will be given of a brief structure of the electric power steering apparatus mentioned above with reference to FIG. 1. A shaft 102 of a steering wheel 101 is coupled to a tie rod 106 of a steered wheel via reduction gears 103, universal joints 104a and 104b and a pinion rack mechanism 105. The shaft 102 is provided with a torque sensor 107 detecting a steering torque of the steering wheel 101, and a motor 108 assisting a steering force of the steering wheel 101 is coupled to the shaft 102 via the reduction gears 103.

It is necessary to correctly execute the control in such a manner that the motor 108 of the electric power steering apparatus having the structure mentioned above outputs a desired torque corresponding to a handle operation by a driver. A vector control corresponding to one of typical control methods for controlling the motor 108 of the electric power steering apparatus is disclosed, for example, in Japanese Patent Application Laid-open No. 2001-18822A. FIG. 2 is a block diagram showing a basic structure of a control system disclosed in Japanese Unexamined Patent Publication No. 2001-18822.

Describing the control apparatus, a torque command value Tref and a rotation angle θ are inputted to a current command value calculating section 204. The torque command value Tref is calculated by a torque command value calculating section (not shown) on the basis of a steering torque Tr detected by the torque sensor 107, and the rotation angle θ corresponds to an electrical angle of the motor 108. The current command value calculating section 204 calculates a current command value Iqref of a q-axis component and a current command value Idref of a d-axis component. Generally, the current command value Iqref is in proportion to the torque command value Tref, and the current command value Idref equals to "0". On the other hand, as an angle detecting device for detecting the rotation angle θ of the motor 108, a resolver 201 is installed. A signal output from the resolver 201 does not directly indicate the rotation angle θ, the rotation angle θ is calculated in a rotation angle detecting circuit 202 such as a resolver-digital conversion circuit or the like.

The present block structure diagram exemplifies a feedback control system, and it is necessary to execute a feedback control by detecting actual motor currents Ia, Ib and Ic of the motor 108, with respect to the current command values Iqref and Idref mentioned above. Specifically, the motor currents Ia and Ic are detected in the current detecting devices 205-1 and 205-2, and the motor current Ib is calculated as "Ib=−(Ia+Ic)", in a subtraction section 207-3 on the basis of a relation of "Ia+Ib+Ic=0". Next, they are converted into motor currents Iq and Id by a three-phase/two-phase conversion section 206 for a vector control. The rotation angle θ mentioned above of the motor is utilized for the conversion. The motor currents Iq and Id are respectively feedbacked to the subtraction sections 207-1 and 207-2, a deviation ΔIq between the current command value Iqref and the motor current Iq is calculated by the subtraction section 207-1, and a deviation ΔId between the current command value Idref (normally Idref=0) and the motor current Id is calculated by the subtraction section 207-2.

The deviations ΔIq and ΔId are inputted to a proportional integral (PI) control section 208, and voltage command values Vdref and Vqref are outputted from the PI control section 208. Further, since it is necessary that the actual motor 108 supplies a three-phase current, the voltage command values Vdref and Vqref are converted into three-phase voltage command values Varef, Vbref and Vcref by a two-phase/three-phase conversion section 209. A PWM control section 210 generates a PWM control signal on the basis of the voltage command values Varef, Vbref and Vcref, and an inverter circuit 211 supplies the current to the motor 108 on the basis of the PWM control signal, and supplies the motor currents Ia, Ib and Ic in such a manner that the deviations ΔIq and ΔId with respect to the current command value Iqref and Idref become 0.

A feature of the vector control mentioned above exists in a matter that a control calculation is executed by two phases converted into the d-axis and the q-axis in the middle of the vector control in spite that the motor current of the three-phase motor corresponding to the controlled subject is detected by three phases Ia, Ib and Ic, and the motor currents Ia, Ib and Ic are supplied by the inverter circuit. Converting into the d-axis and the q-axis as mentioned above is advantageous in the case of independently controlling the torque, however, the following problems exist.

For example, in the case that a resistive component of a motor winding corresponding to a motor parameter of the motor 108 is changed on the basis of a heat generation of the motor winding, if a heat radiating condition or the like is different in each of the phases, for example, if a winding resistance Ra of the a-phase motor becomes (Ra+ΔR) in comparison with the other phases, a motor current Ia is changed to (Ia+ΔI). On the contrary, if the winding resistances of the b-phase and c-phase motors are not changed, and the same currents Ib and Ic as before are applied, a conversion as described in numerical expression 1 is executed in the three-phase/two-phase conversion section 206.

$$\begin{bmatrix} Id \\ Iq \end{bmatrix} = \begin{bmatrix} -\cos(\theta) & -\cos(\theta - 2\pi/3) & -\cos(\theta + 2\pi/3) \\ \sin(\theta) & \sin(\theta - 2\pi/3) & \sin(\theta + 2\pi/3) \end{bmatrix}$$ [Numerical Expression 1]

$$\begin{bmatrix} Ia + \Delta Ia \\ Ib \\ Ic \end{bmatrix}$$

$$= \begin{bmatrix} \Delta Ia \cdot \cos(\theta) - \cdots \\ \Delta Ia \cdot \sin(\theta) + \cdots \end{bmatrix}$$

In other words, when the parameter change generated in the a-phase is diffused to elements in the d-axis and the q-phase, particularly returned to the voltage command values Varef, Vbref and Vcref by the two-phase/three-phase conversion section 209 after passing through the PI control section 208, an error compensation value by the a-phase parameter change is embedded to the b-phase and c-phase voltage command values. Since the parameter change is generated only in the a-phase originally, the error should be compensated only in the a-phase, however, the error compensation value is contained also in the b-phase and the c-phase. Further, if a rotation speed (an angular velocity ω)) of the motor is high, the error (ΔIa·cos θ, ΔIa·sin θ) is changed to a high speed in the d-axis and the q-axis, and in the case that the current control section can not follow, a torque ripple is generated.

Further, in the control of the three-phase motor as shown in FIG. 2, there is employed a control system which converts the three-phase motor currents Ia, Ib and Ic corresponding to the controlled subject into the d-axis and q-axis currents Id and Iq once in the control system so as to determine the control amount, and again returns to the three phases. Accordingly, in the case that the change generated in a partial phase in three phases, for example, the change of the resistance value due to a temperature change of the winding resistance of the motor is different in each of the phases, the change amounts in the phases are mixed at a time of being converted into the d-axis and the q-axis, in the control system mentioned above, so that it is impossible to execute the control which uniquely corresponds to each of the phases. As a result, an error of the current control is generated, and it is impossible to converge the error. Accordingly, there is generated a problem that a steady-state deviation is left.

Further, in the control of the electric power steering apparatus, there exists a control system which executes a current control individually in three phases as shown in Japanese Patent Application Laid-open No. 2000-118424 A, without adopting the system converting the three-phase motor into the d-axis and the q-axis. However, totally four conditions comprising a condition that a total of the three-phase currents is zero (Ia+Ib+Ic=0) in addition to the current control condition in each of the phases exist as a condition satisfied by the controlled subject with respect to the control amounts comprising the motor currents Ia, Ib and Ic, the error is accumulated, and is not said to be preferable as the control system.

If the three-phase motor is controlled by the vector control using the d-axis and q-axis conversions as mentioned above, it is impossible to execute the unique control in each of the phases, for example, with respect to a tolerance in each of the phases of an inductance value or a resistance value of the winding of the three-phase motor, or the dispersion in each of the phases of the change amount of the resistance value due to the temperature change, and the stationary-state deviation of the current control is left. Further, in the individual current control of three phases, since four conditions to be satisfied exist in spite of three control amounts, the error is accumulated and the control system is not said to be preferable.

Further, in the electric power steering apparatus as shown in FIG. 1, the control of the motor 108 is important, however, relations shown in the following numerical expressions 2, 3 and 4 are established, for example, in the voltage and the current of the three-phase motor.

$Van=Va-Vn=EMFa+La\cdot(dIa/dt)+Ra\cdot Ia$ [Numerical Expression 2]

$Vbn=Vb-Vn=EMFb+Lb\cdot(dIb/dt)+Rb\cdot Ib$ [Numerical Expression 3]

$Vcn=Vc-Vn=EMFc+Lc\cdot(dIc/dt)+Rc\cdot Ic$ [Numerical Expression 4]

In this case, a description will be given of definitions relating to the voltage and the current of the motor, and the inductance value and the resistance value of the motor winding with reference to FIG. 3.

Reference symbols Van, Vbn and Vcn denote a voltage between a neutral point of the motor and each of the phases (a-phase, b-phase and c-phase). Reference symbols Va, Vb, Vc and Vn denote a voltage between a ground earth and each of the phase terminals and a voltage between the ground earth and the neutral point, in other words, a potential. Reference symbols Ia, Ib and Ic denote respective phase currents of the motor. Reference symbols La, Lb and Lc and reference symbols Ra, Rb and Rc denote an inductance value and a resistance value in the respective phases of the motor winding.

In this case, if the neutral point potential Vn is changed, the voltages Van, Vbn and Vcn in the respective phases are changed, and if the current control is not executed on the basis of the error, a torque ripple is increased.

In response to the problem mentioned above, for example, Japanese Patent Application Laid-open No. 2002-84758A discloses a control system stabilizing the neutral point, in connection with the motor control of the structure provided with a power source in the neutral point.

However, there is nothing which discloses the control system stabilizing the neutral point in the motor control of the system in which the power source is not provided in the neutral point. If the potential of the neutral point is unstable as mentioned above, the torque ripple of the motor becomes undesirably larger. Further, if a specific sensor is necessary for a control for stabilizing the potential of the neutral point, a cost is increased, and if a specific control is executed, a processing load of a CPU is increased.

The present invention is made by taking the circumstances mentioned above into consideration, and a first object of the present invention is to provide a control apparatus of an electric power steering apparatus which can execute a motor control in such a manner that a robust control is generated with respect to a parameter change in each of phases in the case that a polyphase motor is used in a motor-drive power steering apparatus, and has a reduced torque ripple. Further, a second object of the present invention is to provide a control apparatus of an electric power steering apparatus which can execute a stable motor control without leaving an error in each of the phases with respect to a dispersion of a control amount in each of the phases, in a control of a three-phase motor.

Further, a third object of the present invention is to provide a control apparatus of an electric power steering apparatus which can achieve a handle operation having a good feeling by stabilizing a neutral point of a polyphase motor in which a power source is not installed at the neutral point so as to make it possible to control the motor with a reduced torque ripple and noise, in a control system in which a control process is simple and a burden on a CPU or the like is small, without installing any specific sensor.

DISCLOSURE OF THE INVENTION

The present invention relates to a control apparatus of an electric power steering apparatus structured such as to apply a steering assist force generated by a n-phase (in this case, "n" being an integral number equal to or more than 3) motor to a steering system of a vehicle, and the first object of the present invention is achieved by being provided with at least (n−1) numbers of current detecting means for detecting a current Im. (in this case, "m" being 1, 2, ..., n) in each of phases of the motor, a current command value calculating means for outputting a current command value Imref (in this case, "m" being 1, 2, ..., n) in each of the phases, and n numbers of current control means, and executing a current control of each of the phases by the current control means having the current command value Imref in each of the phases and the current Im in each of the phases as an input.

Further, the present invention relates to a control apparatus of an electric power steering apparatus structured such as to apply a steering assist force generated by a three-phase motor to a steering system of a vehicle, and the second object of the present invention is achieved by being provided with three respective-phase counter electromotive voltage calculating means for calculating back electromotive voltages (back EMF) e1, e2 and e3 in respective phases of the three-phase motor, and two respective-phase current control means, calculating a command value ref3 in one remaining phase from command values ref1 and ref2 corresponding to outputs of the two current control means, and adding the back EMFs e1, e2 and e3 to the command values ref1, ref2 and ref3.

Further, the present invention relates to a control apparatus of an electric power steering apparatus provided with a polyphase motor applying a steering assist force to a steering system of a vehicle, a current command value calculating means for calculating a current command value in each of phases applied to the motor, a current detecting means for detecting a current in each of the phases of the motor, and a current control means for calculating a voltage command value in each of the phases on the basis of the current command value and the detected current, and the third object of the present invention can be achieved by being provided with a counter electromotive voltage computing means for estimating a counter electromotive voltage value induced in the motor, subtracting an average value of the voltage command value in each of the phases from the voltage command value in each of the phases, and controlling on the basis of a new voltage command value in each of the phases obtained by adding the counter electromotive voltage value in each of the phases.

BRIEF DESCRIPTION OF THE DRAWINGS

FIG. 16 is a view showing a counter electromotive voltage calculation using a rotation angle and an angular velocity of the motor;

BEST MODE FOR CARRYING OUT THE INVENTION

Embodiment 1

Figure 1:
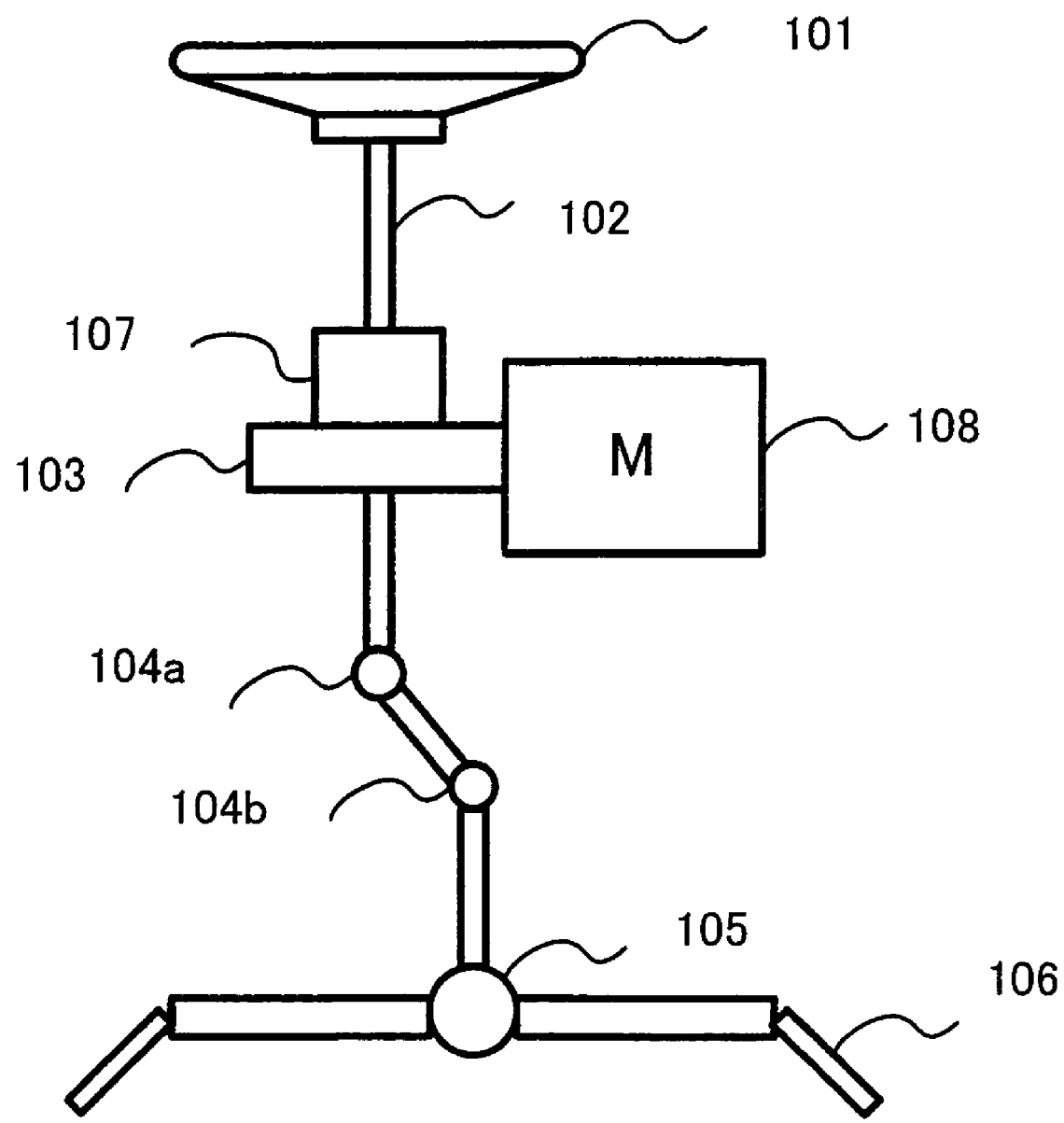
FIG. 1 is a view showing an example of a structure of a general electric power steering apparatus.
Figure 2:
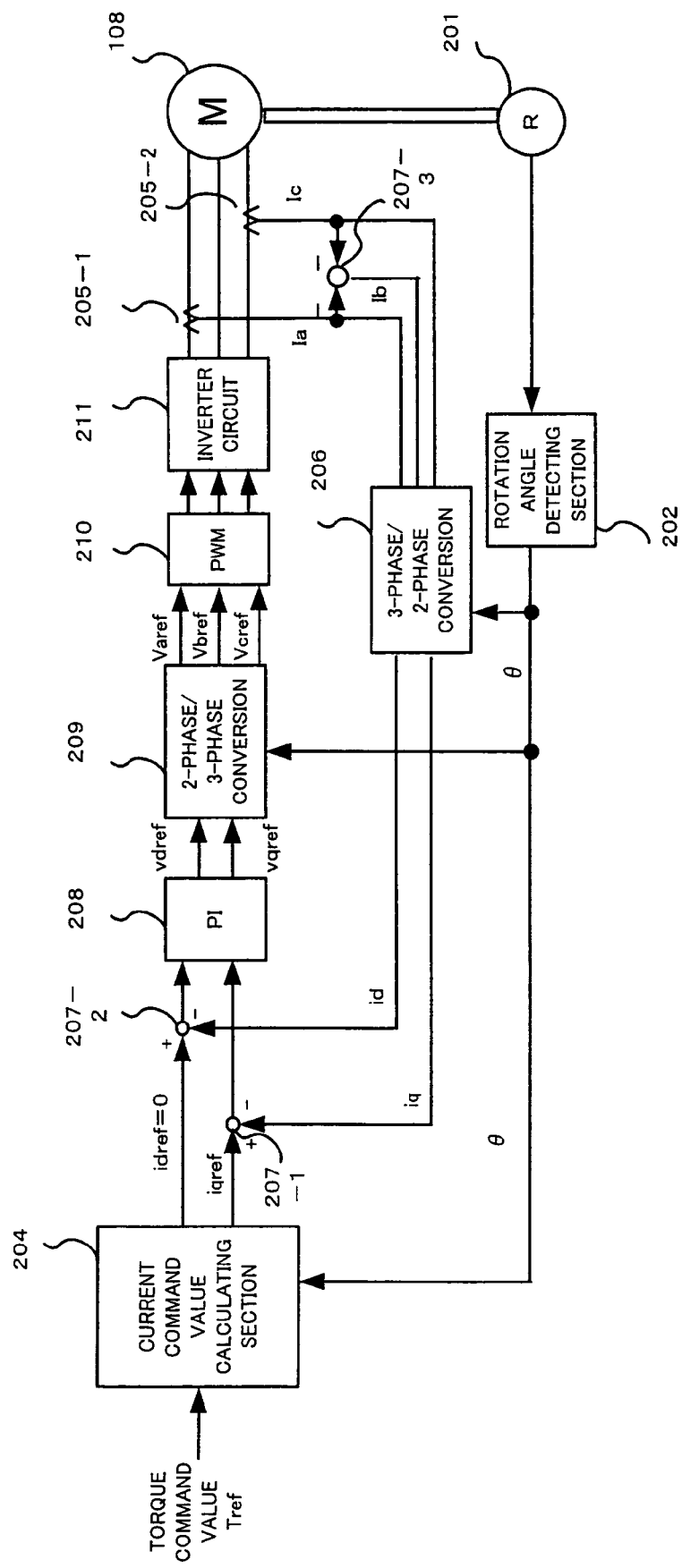
FIG. 2 is a block diagram showing a basic control system of a conventional apparatus.
Figure 3:
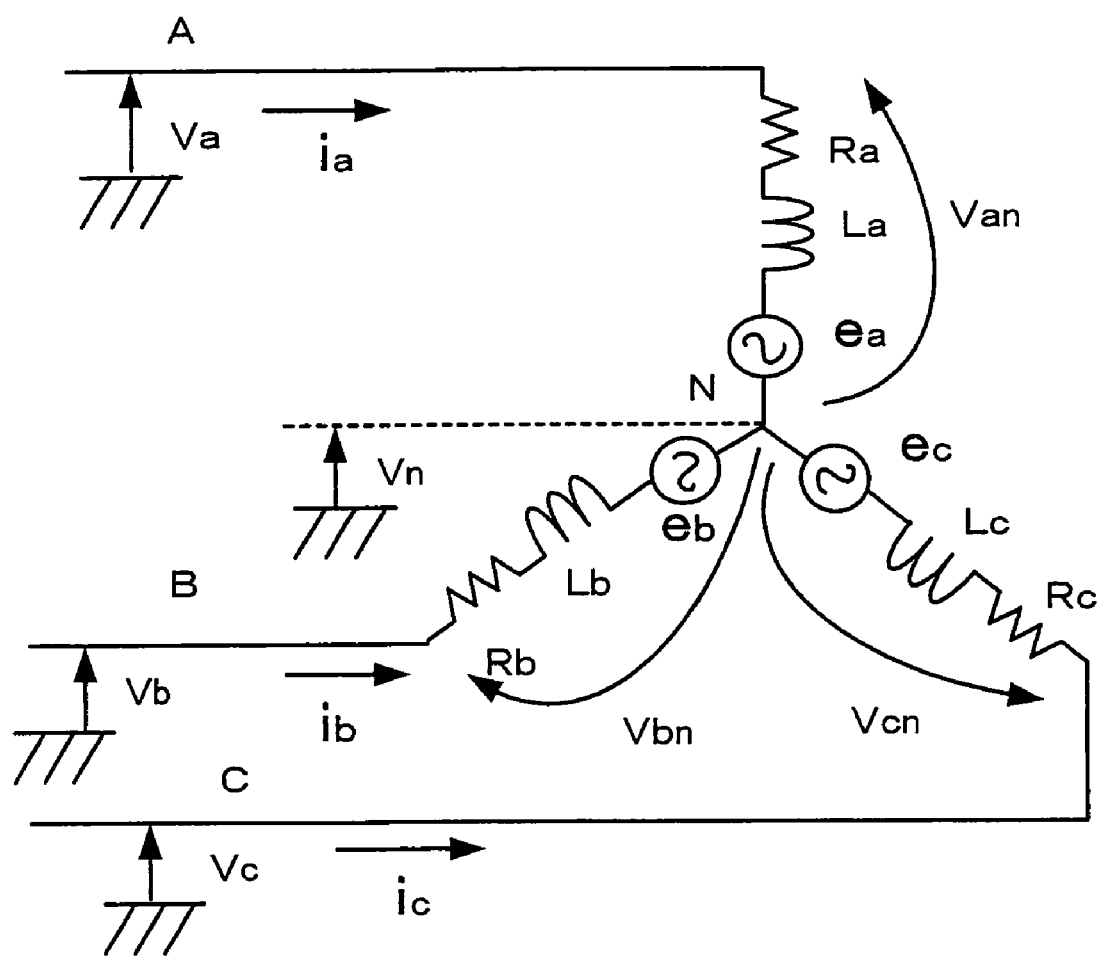
FIG. 3 is a view showing a relation among a voltage and a current of a motor, and an inductance value and a resistance value of a winding.
Figure 4:
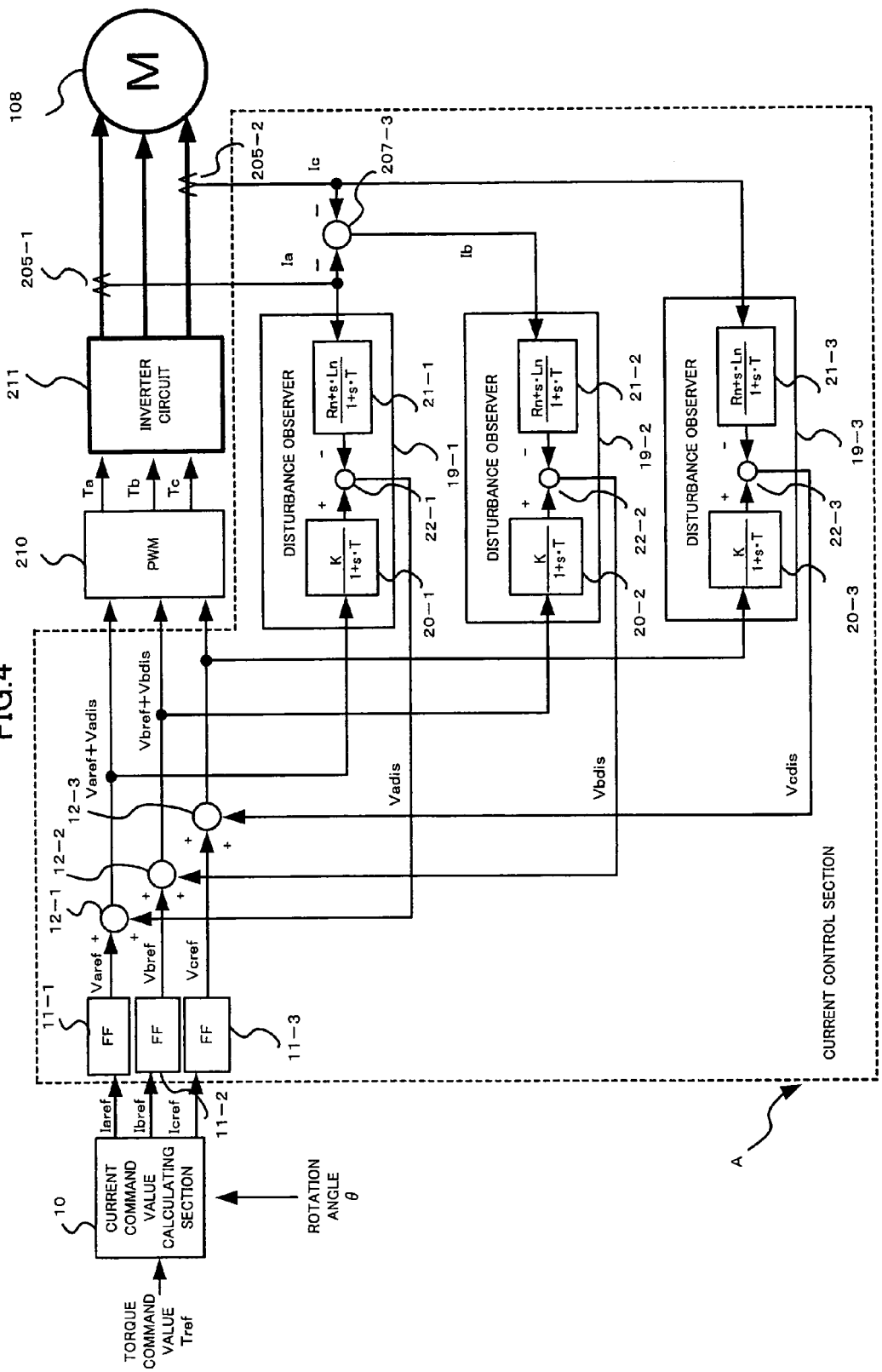
FIG. 4 is a block diagram showing a structure system of an embodiment-1 in accordance with the present invention.

A description will be given first of an embodiment-1 in accordance with the present invention with reference to FIG. 4. FIG. 4 corresponds to FIGS. 1 and 2.

The present embodiment-1 corresponds to an embodiment in the case that the present invention is applied to an n-phase motor (n=3). In the case of n=3, a relation m=1, 2, 3 is established, and current command values Imref in respective phases become I1ref, I2ref and I3ref, however, are described as Iaref, Ibref and Icref as a general notation. Further, respective phase currents Im of the motor become I1, I2 and I3, however, are described as Ia, Ib and Ic for the same reason.

As shown in FIG. 4, a torque command value Tref and a rotation angle θ of the motor 108 are inputted to a current command value calculating section 10 corresponding to the current command value calculating means, and the current command values Imref in the respective phases are outputted as Iaref, Ibref and Icref in the case of the three-phase. On the other hand, the respective detected phase currents Im of the motor become Ia, Ib and Ic in the case of the three-phase motor. Accordingly, in the current detecting device 205-1 and the current detecting device 205-2 corresponding to the current detecting means, there are detected the currents Ia and Ic of the a-phase motor and the c-phase motor. The motor current Ib in the b-phase is calculated as Ib=−(Ia+Ic) on the basis of the relation "Ia+Ib+Ic=0" in the subtracting section 207-3. In the three-phase motor in which the relation n=3 is established, at least two (n−1) current detecting means are required. Of course, in order to directly detect the current Ib, three current detecting means may be used.

Next, the respective phase current command values Iaref, Ibref and Icref and the respective detected phase currents Ia, Ib and Ic are inputted to the current control means. In FIG. 4, a portion surrounded by a broken line "A" corresponds to a current control means, and is set as a current control section A. The current control section A in accordance with the present embodiment-1 is constituted by a feedforward control means and a disturbance observer. The current command values Iaref, Ibref and Icref are respectively inputted to an a-phase FF control section 11-1, a b-phase FF control section 11-2 and a c-phase FF control section 11-3 corresponding to the feedforward (hereinafter, refer to as "FF") control means, and the voltage command values Varef, Vbref and Vcref are respectively outputted from the FF control sections 11-1 to 11-3. A relation between the current command value and the voltage command value is a relation as shown by the below numerical expression 5.

$$Varef=(Rna+s \cdot Lna) \cdot Iaref$$

$$Vbref=(Rnb+s \cdot Lnb) \cdot Ibref$$

$$Vcref=(Rnc+s \cdot Lnc) \cdot Icref \qquad \text{[Numerical Expression 5]}$$

In which reference symbol "Rn" denotes a wiring resistance value of a motor rating, reference symbol "Ln" denotes a wiring inductance value of the motor rating, reference symbol "Rn" denotes a wiring resistance value of an a-phase motor rating, and reference symbol "Lna" denotes a wiring inductance value of the motor rating. A relation "Rna=Rnb=Rnc=Rn, Lna=Lnb=Lnc=Ln" is established on design.

On the other hand, the disturbance observer is constituted by an a-phase disturbance observer 19-1, a b-phase disturbance observer 19-2 and a c-phase disturbance observer 19-3. To each of the disturbance observers, there are inputted the detected motor current I, and an added value (Vref+Vdis) of a disturbance value Vdis and a voltage Vref corresponding to an output of the disturbance observer in each of the phases, and the disturbance value Vdis is outputted thereto. For example, with respect to the a-phase, the a-phase motor current Ia and the a-phase combined value (Varef+Vadis) are inputted to the disturbance observer 19-1, and the a-phase disturbance value Vadis is outputted. In the b-phase disturbance observer 19-2 and the c-phase disturbance observer 19-3, in the same manner, the b-phase motor current Ib and the c-phase motor current Ic, and the combined values (Vbref+Vbdis) and (Vcref+Vcdis) are inputted thereto, and the disturbance values Vbdis and Vcdis are outputted thereto, respectively.

The disturbance observer 19 is constituted by a transfer function section 20, a transfer function section 21 and a subtraction section 22. The transfer function section 21 simulates (Rn+s·Ln) corresponding to a reverse system of a motor model, and a primary delay function (1+s·T) in a denominator expresses a filter removing a noise generated in a current detecting means or the like. Further, in order to balance with (1+s·T) expressing the noise filter of the transfer function section 21 in a time delay, the same primary delay function (1+s·T) is inserted to the transfer function section 20. In other words, the output of the transfer function section 21 satisfies a relation of the following numerical expression in the case of disregarding the primary delay function corresponding to the noise filter.

$$Va=(Rn+s \cdot Ln)Ia$$

$$Vb=(Rn+s \cdot Ln)Iba$$

$$Vc=(Rn+s \cdot Ln)Ica \qquad \text{[Numerical Expression 6]}$$

In other words, the actual motor voltages Va, Vb and Vc are estimated from the detected actual motor currents Ia, Ib and Ic. Further, in the disturbance observers 19-1, 19-2 and 19-3, differences between the combined values (Vref+Vdis), (Vref+Vdis) and (Vref+Vdis) corresponding to the final voltage command value, and the motor voltages Va, Vb and Vc estimated from the actual motor currents Ia, Ib and Ic are respectively calculated in the subtraction sections 22-1, 22-2 and 22-3, and are calculated as the disturbance values Vadis, Vbdis and Vcdis. The disturbance values Vadis, Vbdis and Vcdis are respectively feedbacked to the addition sections 12-1, 12-3 and 12-4, and are respectively added with the voltage command values Varef, Vbref and Vcref corresponding to the outputs of the FF control sections 11-1, 11-2 and 11-3.

The combined values (Vref+Vdis), (Vref+Vdis) and (Vref+Vdis) corresponding to the outputs of the addition sections 12-1, 12-2 and 12-3 form final voltage command values so as to be inputted to the PWM control section 210, the PWM control section 210 generates PWM signals Ta, Tb and Tc on the basis of the voltage command value in each of the phases, and the inverter circuit 211 is PWM controlled. Further, the inverter circuit 211 supplies the motor currents Ia, Ib and Ic to the motor 108 on the basis of the PWM signals Ta, Tb and Tc, that is, on the basis of the combined values (Vref+Vdis), (Vref+Vdis) and (Vref+Vdis) corresponding to the voltage command value.

The above is the description of the operation of the embodiment-1. In the operation of the motor control mentioned above, for example, even if the a-phase motor winding resistance corresponding to the motor parameter is changed to (Ra+ΔRa) from Ra, whereby the a-phase motor current is changed to (Ia+ΔIa), the current command values Iaref, Ibref and Icref and the detected motor currents Ia, Ib and Ic are independent in each of the phases, and the current control is independently controlled in each of the phases. Accordingly, the change of the a-phase motor parameter is closed in the a-phase control loop (the disturbance value Vadis), and is independent from the b-phase and c-phase controls. In other words, since the change of the a-phase motor parameter is independently corrected in the a-phase control loop, the a-phase correction is easily executed in comparison with the conventional control. Further, since the b-phase and the c-phase corresponding to the other phases are not affected, there is an advantage that the control is not affected by the parameter change of the phases having no relation, which is particularly generated in the conventional control.

Accordingly, in the motor of the electric power steering apparatus, even if the control parameter such as the motor parameter is generated only in the partial phase, it is possible to execute the correction control while embedding the change. Therefore, the torque ripple of the motor is not generated, and it is possible to expect to a handle operation having a good feeling.

Particularly, in the case that the current control section A is constituted by the FF control and the disturbance observer such as the present embodiment-1, since the motor model ($Rn+s \cdot Ln$) is used in the FF control and the disturbance observer, it is possible to expect a particularly good effect with respect to the parameter change of the motor model. Specifically, it is possible to compensate the change of the motor parameter by estimating the parameter on design of each of the phases, for example, the errors $\Delta Rna$ and $\Delta Lna$ from the winding resistance value Rna and the winding inductance value Lna in the a phase, and using them as $(Rna+\Delta Rna)$ and $(Lna+\Delta Lna)$ in the current control in each of the phases.

Embodiment-2

Figure 5:
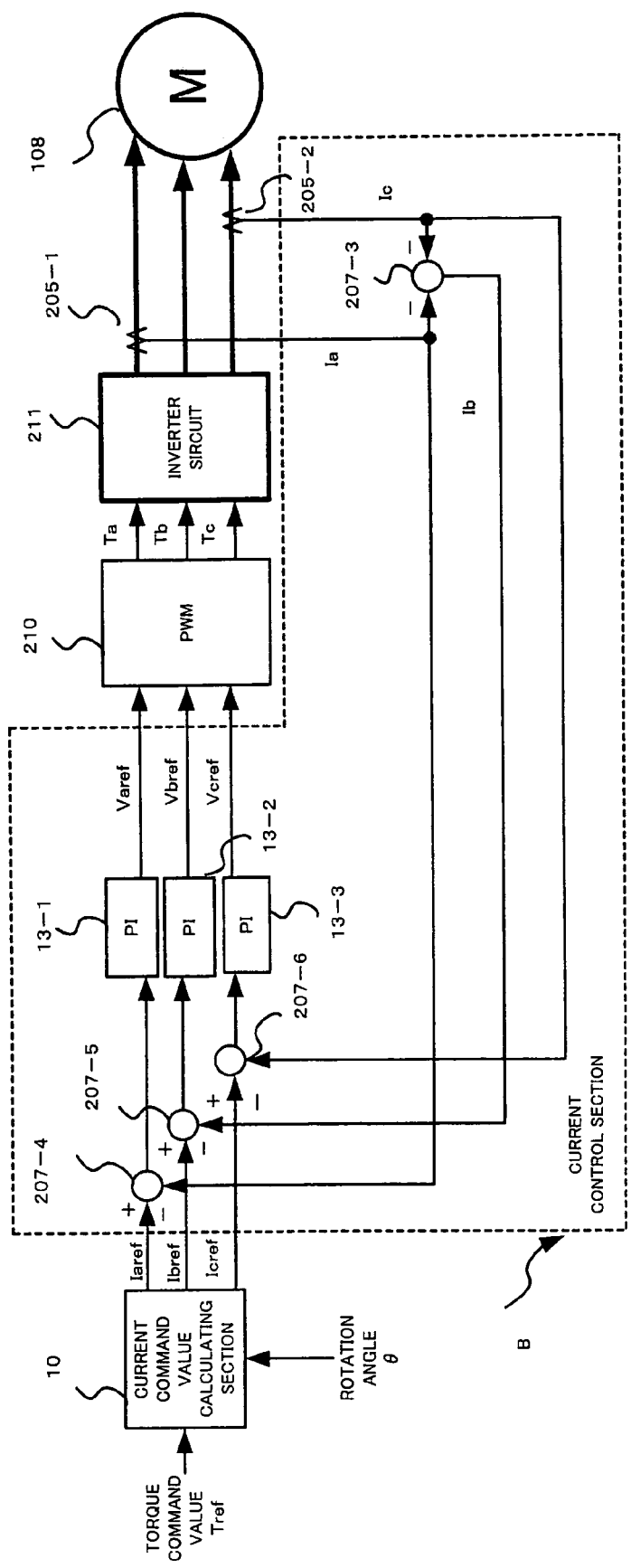
FIG. 5 is a block diagram showing a structure system of an embodiment-2 in accordance with the present invention.

FIG. 5 corresponds to an embodiment in the case in which the current control means is executed by a feedback control (hereinafter, refer to "FB" control). The present embodiment-2 is structured such as to include the current command value calculating section 10 outputting the current command values Iaref, Ibref and Icref in the respective phases, the current detecting devices 205-1 and 205-2 for measuring the currents Ia, Ib and Ic in the respective phases of the motor, the subtraction section 207-3, and a current control section B independently controlling with respect to each of the phases and outputting voltage command values Varef, Vbref and Vcref in the respective phases.

As an operation of the present embodiment-2, the current command values Iaref, Ibref and Icref in the respective phases are outputted in the current command value calculating section 10. Further, the currents Ia and Ic in the respective phases of the motor are respectively detected by the current detecting devices 205-1 and 205-2, and the current Ib is calculated by the subtraction section 207-3 on the basis of the relation "Ib=−(Ia+Ic)". The current command values Iaref, Ibref and Icref and the detected motor currents Ia, Ib and Ic are respectively calculated as the deviations $\Delta Ia=(Iaref-Ia)$, $\Delta Ib=(Ibref-Ib)$ and $\Delta Ic=(Icref-Ic)$ in the subtraction sections 207-4, 207-5 and 207-6. The deviations $\Delta Ia$, $\Delta Ib$ and $\Delta Ic$ in the respective phases are respectively inputted to the PI control sections 13-1, 13-2 and 13-3, and the PI control sections 13-1 to 13-3 respectively output the voltage command values Varef, Vbref and Vcref.

Accordingly, the current command values Iaref, Ibref and Icref in the respective phases, and the detected currents Ia, Ib and Ic in the respective phases of the motor are respectively independently inputted to the current control section B, and the calculation in the current control section B is controlled independently in the respective phases.

The PWM control section 210 generates PWM signals Ta, Tb and Tc in respective phases so as to output while having the voltage command values Varef, Vbref and Vcref as an input, and the inverter circuit 211 supplies the currents Ia, Ib and Ic to the motor 108 on the basis of the PWM signals in such a manner that the deviations $\Delta Ia$, $\Delta Ib$ and $\Delta Ic$ become "0".

Even in the present embodiment-2, the control of the motor 108 calculates the current command values Iaref, Ibref and Icref per the respective phases, detects the motor currents Ia, Ib and Ic per the respective phases, inputs the current command values and the detected currents per the respective phases, and controls the current independently per the respective phases. Accordingly, even if the control parameter such as the motor parameter in the partial phase of the motor or the like is changed, there is executed the control of correcting independently in the changed phase. Therefore, since the change of the parameter in the phase does not affect the other phases, and the control for correcting while closing in the phase is executed, it is possible to execute a particularly effective control.

As described above, in accordance with the present embodiment-2, since the independent control is executed in each of the phases even if the change of the control parameter in the partial phase is generated, the other phases are not affected, and the control can be executed in such a manner that the phase is closed. Therefore, it is possible to effectively correct and control the change. Accordingly, it is possible to achieve the motor control having the reduced torque ripple, and it is possible to execute the handle operation having a good feeling.

Embodiment-3

Figure 6A:
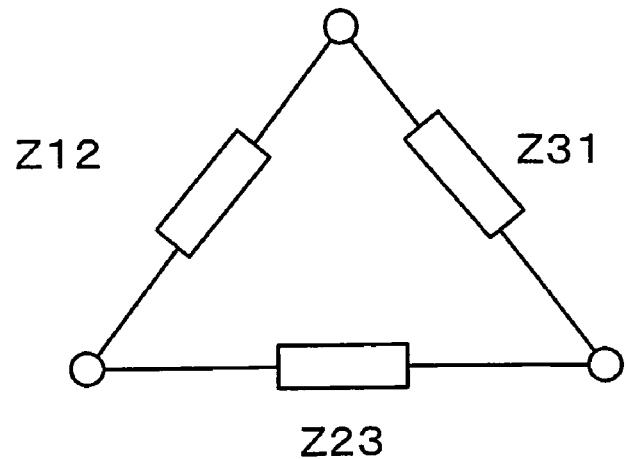
FIGS. 6A and 6B are wiring diagrams for respectively explaining impedance conversions of a Y-wiring and a Δ-wiring of a three-phase motor.
Figure 6B:
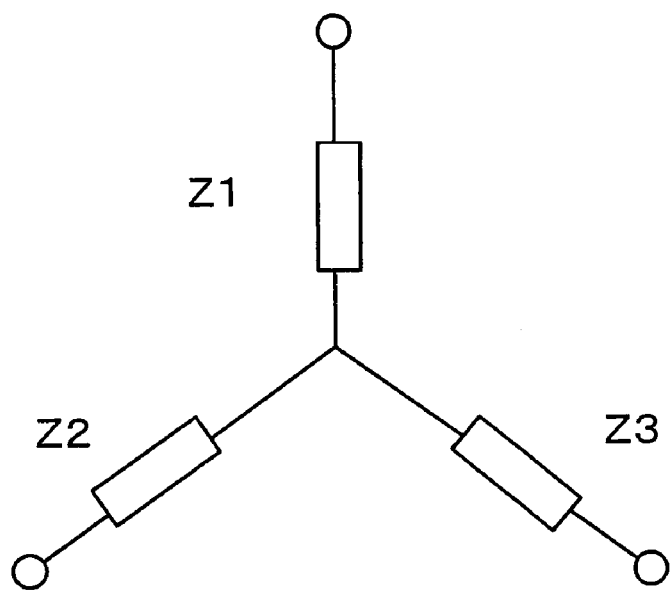

In the case that the motor is constituted by the three-phase motor, a Δ-wire connection as shown in FIG. 6A, and a Y-wire connection as shown in FIG. 6B exist as a motor wire connection. The Y-wire connection is general as the motor wire connection, however, the present invention can be applied to the Δ-wire connection. In other words, the Y-wire connection and the Δ-wire connection execute an impedance conversion as shown by the following numerical expression 7, and the present invention can be applied to the motor of the Δ-wire connection by converting the value in accordance with the conversion expression.

$Z1=Z31 \cdot Z12/(Z12+Z23+Z31)$ $Z2=Z12 \cdot Z23/(Z12+Z23+Z31)$ $Z3=Z23 \cdot Z31/(Z12+Z23+Z31)$ [Numerical Expression 7]

If the conversion is executed on the basis of the conversion expression in the numerical expression 7 mentioned above, the present invention can be applied whichever the three-phase motor has the Y-wire connection or the Δ-wire connection. Specifically, in the case that an impedance Z12 is changed to an impedance $(Z12+\Delta Z12)$, an error thereof becomes models $(Z1+\Delta Z1)$, $(Z2+\Delta Z2)$ and $(Z3+\Delta Z3)$ of the Y-wire connection, and it is possible to compensate in the respective current control section of three phases. As is different from the current control on the d-axis and the q-axis, the impedance error $\Delta Z12$ is changed in each of the phases in correspondence to the rotation angle θ. Accordingly, it is possible to suppress the generation of the torque ripple even at the high speed rotation.

In this case, the embodiment-1 and the embodiment-2 are described on the basis of the example of the three-phase motor, however, the present invention is not limited to the three-phase motor of n=3, but can be applied to a polyphase motor such as a five-phase motor of n=5, and the like.

In accordance with the present invention (the embodiments-1 to -3), since the structure executes the current detection of the polyphase motor of the electric power steering apparatus and the calculation of the current command value, and executes the current control having the current command values per the respective phases and the detected current values per the respective phases in the respective phases, it is possible to execute the motor control which is robust in the change of the control parameter such as the motor parameter or the like generated in the partial phase.

Next, a description will be given of a principle of the other embodiment in accordance with the present invention.

Figure 7:
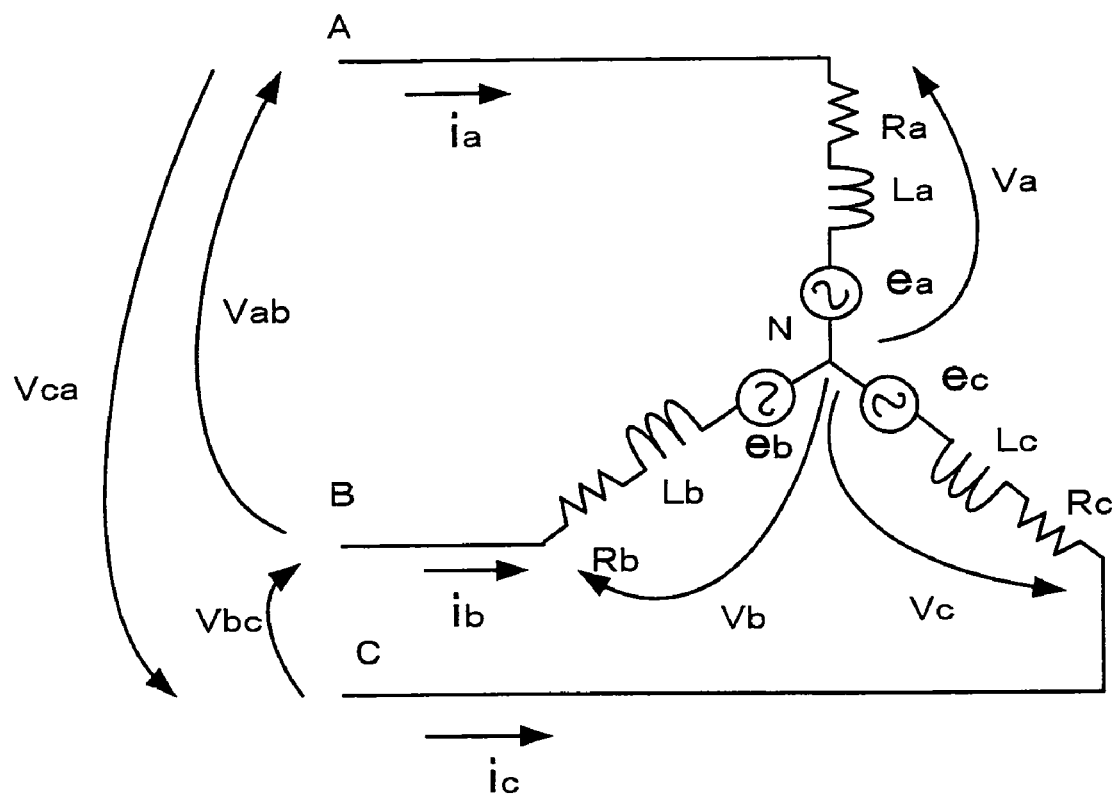
FIG. 7 is a view for explaining a relation among an inductance, a resistance and a back EMF of a winding of the motor, a motor voltage and a current.

First, a relation between a voltage and a current in each of the phases of the three-phase motor is in a relation as shown in FIG. 7, and can be expressed by the following numerical expression 8. In the following description, the description will be given of an example in which phase voltages Va, Vb and Vc are detected as the voltage of the motor. However, the relation establishes even if the voltage is constituted by line voltages Vab, Vbc and Vca. In this case, the winding resistances Ra, Rb and Rc of the motor and the inductances La, Lb and Lc of the motor can be determined on the basis of the characteristic of the motor. A relation between the values and each of phase back EMFs ea, eb and ec of the motor is expressed by the following numerical expression 8.

$$Va = ea + (Ra + s \cdot La) \cdot Ia$$

$$Vb = eb + (Rb + s \cdot Lb) \cdot Ib$$

$$Vc = ec + (Rc + s \cdot Lc) \cdot Ic \qquad \text{[Numerical Expression 8]}$$

where, "s" represents Laplace operator.

In this case, a relation "La=Lb=Lc=L" and a relation "Ra=Rb=Rc=R" are generally established. Accordingly, the numerical expression 8 can be expressed by the following numerical expression 9.

$$Va = ea + (R + s \cdot L) \cdot Ia$$

$$Vb = eb + (R + s \cdot L) \cdot Ib$$

$$Vc = ec + (R + s \cdot L) \cdot Ic \qquad \text{[Numerical Expression 9]}$$

The following numerical expression 10 can be obtained by adding the phase voltages Va, Vb and Vc in three expressions.

$$Va + Vb + Vc = (ea + eb + ec) + R(Ia + Ib + Ic) + s \cdot L(Ia + Ib + Ic)$$
[Numerical Expression 10]

In this case, the following numerical expression 11 can be obtained by substituting the total of the motor currents (Ia+Ib+Ic)=0 for the numerical expression 10.

$$Va + Vb + Vc = (ea + eb + ec) \qquad \text{[Numerical Expression 11]}$$

In this case, estimated back EMFs eaf, ebf and ecf are compensated with respect to the back EMFs ea, eb and ec in the respective phases induced to the motor. Expressing the back EMFs ea, eb and ec in the respective phased generated by the motor, and the back EMFs eaf, ebf and ecf in the respective phases compensating them as a control block diagram, it can be expressed as FIG. 8. As the current control with respect to the current command value Iref in each of the phases, in the example in FIG. 8, there is shown a current control system of executing a proportional integral (PI) control after feeding back the detected current Im in each of the phases so as to calculate the deviation with respect to the current command value. Expressing the motor by a motor model, it can be expressed as a transfer function (1/(R+L·s)) and the back EMFs ea, eb and ec. In the example shown in FIG. 8, the back EMFs eaf, ebf and ecf are compensated after the current control.

Figure 8:
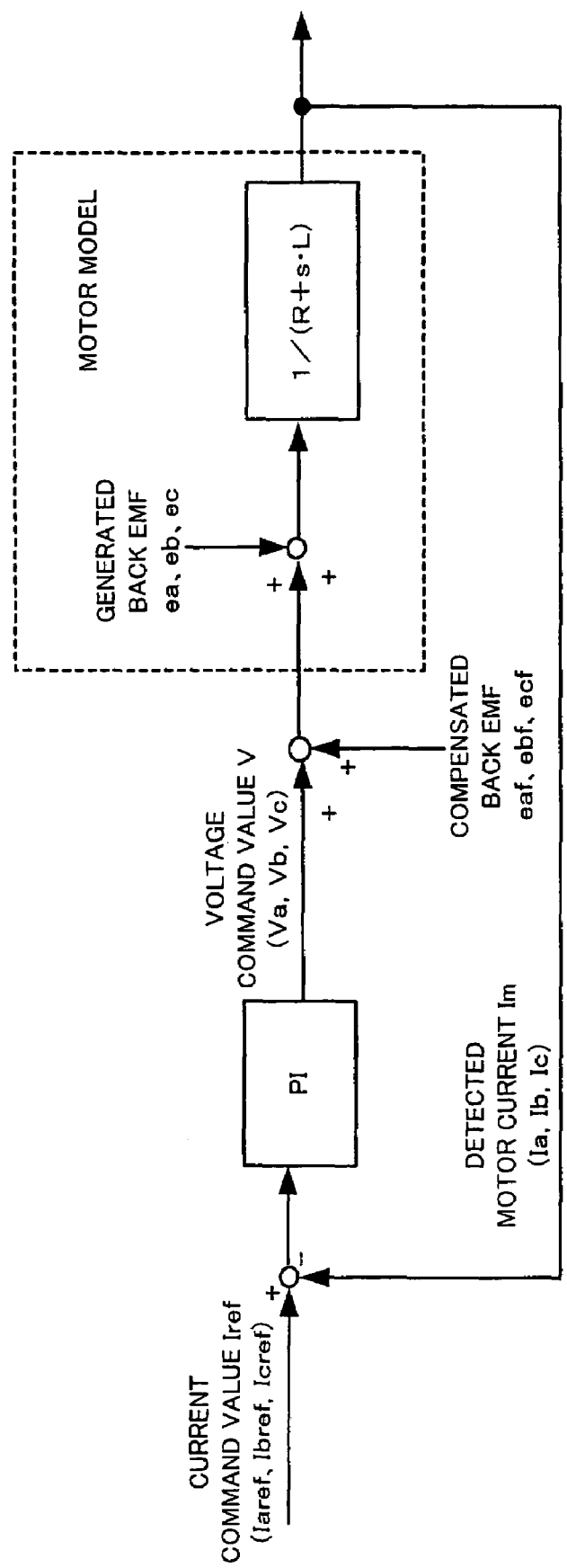
FIG. 8 is a structural block diagram for explaining an significance of a back EMF compensation in the present invention.

Adding the back EMF compensation in FIG. 8 to the numerical expression 11, the numerical expression 11 becomes the below numerical expression 12.

$$Va + Vb + Vc + (eaf + ebf + ecf) = (ea + eb + ec)$$

or $$Va + Vb + Vc = (ea - eaf) + (eb - ebf) + (ec - ecf) \qquad \text{[Numerical Expression 12]}$$

If the back EMF compensation is correctly executed, the above numerical expression 12 becomes the following numerical expression 13 because of the relation "ea=eaf, eb=ebf and ec=ecf".

$$Va + Vb + Vc = 0 + 0 + 0 = 0 \qquad \text{[Numerical Expression 13]}$$

Accordingly, the relation among the phase voltages Va, Vb and Vc can be expressed as the following numerical expression 14.

$$Vb = -Va - Vc \qquad \text{[Numerical Expression 14]}$$

The numerical expression 14 means that if the back EMF is correctly compensated, the phase voltage Vb can be definitely determined on the basis of the phase voltages Va and Vc. Further, the phase voltages Va, Vb and Vc indicate the voltage command value, and the b-phase voltage command value Vb can be definitely determined from the other two-phase voltage command values, that is, the a-phase voltage command value Va and the c-phase voltage command value Vc.

A description will be given below of the other embodiments in accordance with the present invention.

Embodiment-4

A description will be given of an embodiment-4 with reference to FIG. 9.

In a control of the three-phase motor 108, the current command value calculating section 204 inputs the torque command value Tref, the rotation angle θ, the angular velocity ω or the like, and calculates the two-phase current command values Iaref and Icref so as to output. Further, the current control section 10-1 and the current control section 10-2 having the a-phase current command value Iaref and the c-phase current command value Icref as an input are arranged. In this embodiment-4, an a-phase current control means and a c-phase current control means are employed as the current control means, however, a combination of the a-phase and the b-phase or a combination of the b-phase and the c-phase may be employed.

The current control means 10-1 is constituted by the subtraction section 12-1 and a proportional integral (PI) control section 14-1, the current command value Iaref and the actually measured motor current Ia detected by the a-phase current detecting device 205-1 are inputted to the subtraction section 12-1, and the deviation ΔIa is calculated. The deviation ΔIa is inputted to the PI control section 14-1, and a voltage command value Van corresponding to the command value ref1 is outputted. In the same manner, the current control means 10-2 is constituted by the subtraction section 12-2 and the PI control section 14-2, the current command value Icref and the actually measured motor current Ic detected by the c-phase current detecting device 205-2 are inputted to the subtraction section 12-2, and the deviation ΔIc is calculated. The deviation ΔIc is inputted to the PI control section 14-2, and a voltage command value Vcn corresponding to the command value ref2 is outputted. In this case, the a-phase current detecting device 205-1 and the c-phase current detecting device 205-1 are arranged so as to correspond to the same phases as the a-phase current control means 10-1 and the c-phase current control means 10-2. The voltage command value Vbn corresponding to the command value ref3 is calculated as an output of a polarity inversion portion 32-1 by inputting the output to the polarity inversion portion 32-1 after the a-phase voltage command value Van and the c-phase voltage command value Vcn are inputted to the adding section 30-1.

Next, the respective voltage command values Van, Vbn and Vcn, and the a-phase back EMF eaf, the b-phase back EMF ebf and the c-phase back EMF ecf respectively corresponding to the back EMFs e1, e3 and e2 to be compensated are added by the adding sections 34-1, 34-2 and 34-3. Final voltage command values Varef=Van+eaf, voltage command value Vbref=Vbn+ebf and voltage command value Vcref=Vcn+ecf forming respective duty values are outputted from the adding sections 34-1, 34-2 and 34-3. In this case, a description will be given later of an a-phase back EMF calculating section 20-1, a b-phase back EMF calculating section 20-2 and a c-phase back EMF calculating section 20-3 calculating the back EMFs eaf, ebf and ecf.

The voltage command values Varef, Vbref and Vcref are inputted to the PWM control section 210, the a-phase, b-phase and c-phase PWM control signals are inputted to the inverter circuit 211, and the inverter circuit 211 supplies the respective phase motor currents Ia, Ib and Ic to the motor 108.

A description will be given of a detailed calculating procedure of the back EMFs eaf, ebf and ecf to be compensated, with reference to FIGS. 9 and 10.

First, the b-phase motor current Ib is detected by utilizing a relational expression "Ia+Ib+Ic=0". Specifically, in FIG. 9, after the a-phase motor current Ia and the c-phase motor current Ic respectively detected by the current detecting device 205-1 and the current detecting device 205-2 are inputted to the adding section 30-2, the output is inputted to the polarity inversion section 32-2, and is detected as "Ib=−(Ia+Ic)". On the other hand, the respective phase voltages Va, Vb and Vc corresponding to the respective phase terminal voltages of the motor 108 are respectively detected by the voltage detecting devices 40-1, 40-2 and 40-3.

Next, a description will be given of a procedure by which the back EMFs eaf, ebf and ecf are calculated by using the motor voltages Va, Vb and Vc and the motor currents Ia, Ib and Ic mentioned above, with reference to FIG. 10.

The a-phase back EMF calculating section 20-1, the b-phase back EMF calculating section 20-2 and the c-phase back EMF calculating section 20-3 are structured on the basis of the detection principle of the numerical expression 8 or the numerical expression 9. For example, the a-phase back EMF calculating section 20-1 is constituted by the transfer function section 22-1 and the subtraction section 24-1, the current Ia corresponding to one of the respective phase currents of the motor is inputted to the transfer function section 22-1, and the motor voltage Va is inputted to the subtraction section 24-2. "Ia·(Ra+s·La)/(1+s·Tf)" corresponding to the output of the transfer function section 22-1, and the voltage Va corresponding to one of the respective phase terminal voltages are inputted to the subtraction section 24-1, and the back EMF "eaf=Va−Ia·(Ra+s·La)/(1+s·Tf)" is outputted from the subtraction section 24-1. In this case, "1+s·Tf" in the denominator of the transfer function section 22-1 does not exist in the numerical expression 8 and the numerical expression 9, however, this expresses a low-pass filter (LPF) function of the current detecting device and the A/D converting device.

In the case manner, the b-phase back EMF calculating section 20-2 is constituted by the transfer function section 22-2 and the subtraction section 24-2, the current Ib corresponding to one of the respective phase currents of the motor is inputted to the transfer function section 22-2, and the motor voltage Vb is inputted to the subtraction section 24-2. "Ib·(Rb+s·Lb)/(1+s·Tf)" corresponding to the output of the transfer function section 22-2, and the voltage Vb corresponding to one of the respective phase terminal voltages are inputted to the subtraction section 24-2, and the back EMF "ebf=Vb−Ib·(Rb+s·Lb)/(1+s·Tf)" is outputted as the output of the subtraction section 24-2.

The c-phase back EMF calculating section 20-3 is constituted by the transfer function section 22-3 and the subtraction section 24-3, the current Ic corresponding to one of the respective phase currents of the motor is inputted to the transfer function portion 22-3, and the voltage Vc corresponding to one of the respective phase terminal voltages is inputted to the subtraction section 24-3. "Ic·(Rc+s·Lc)/(1+s·Tf)" corresponding to the output of the transfer function section 22-3, and the motor voltage Va is inputted to the subtraction section 24-1, and the back EMF "ecf=Vc−Ic·(Rc+s·Lc)/(1+s·Tf)" is outputted from the subtraction section 24-1.

In this case, the inductance values and the resistance values in the respective phase motor windings are equal, that is, a relation "La=Lb=Lc=L", and "Ra=Rb=Rc=R" is established. Accordingly, the numerical expression 8 can be converted into the numerical expression 9. The back EMFs eaf, ebf and ecf detected in the manner mentioned above are added to the voltage command values Van, Vbn and Vcn in the adding sections 34-1, 34-2 and 34-3, and the voltage command values Varef, Vbref and Vcref are respectively outputted from the adding sections 34-1 to 34-3.

Figure 9:
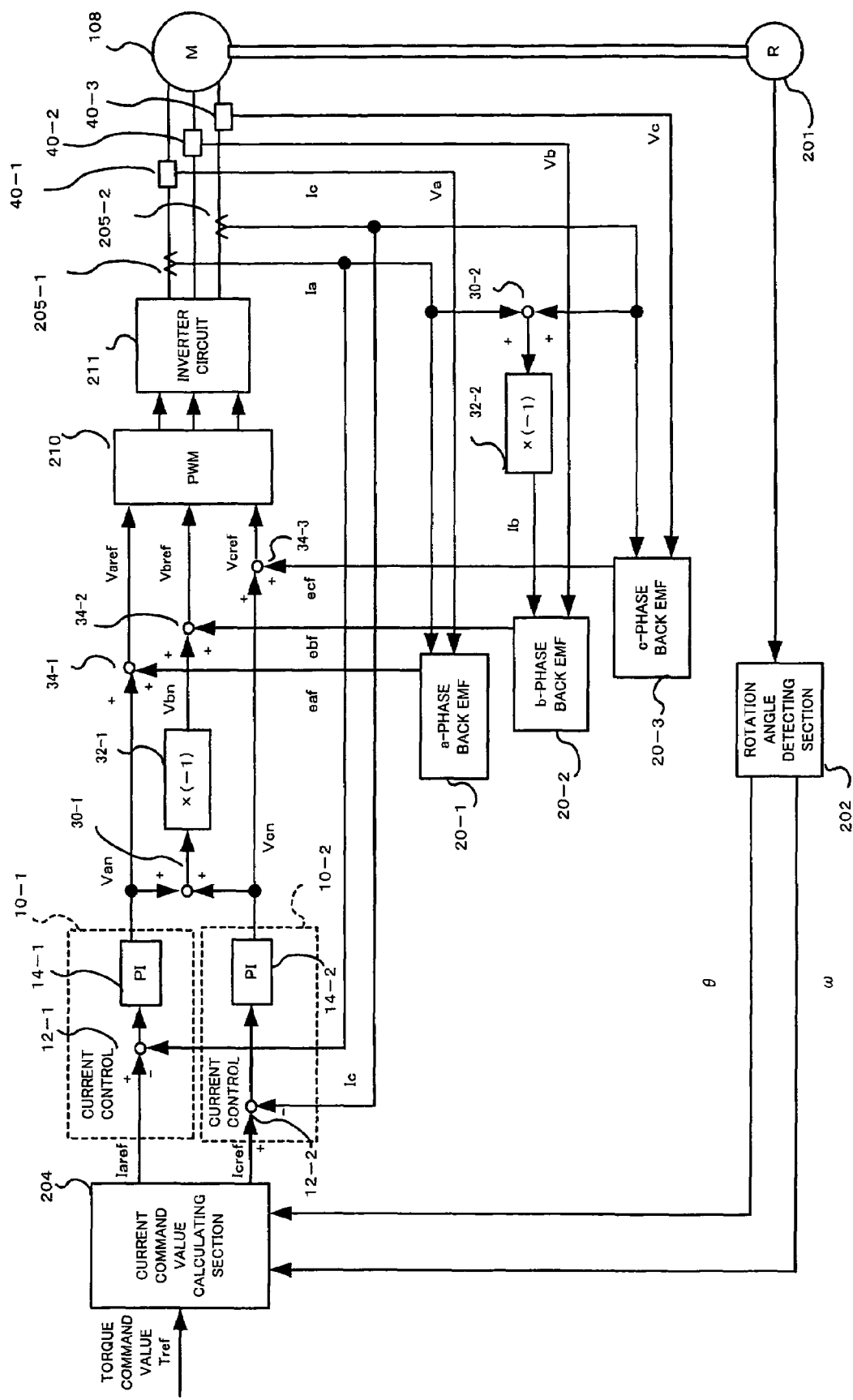
FIG. 9 is a block diagram showing an example of a structure of an embodiment-4 in accordance with the present invention.
Figure 10:
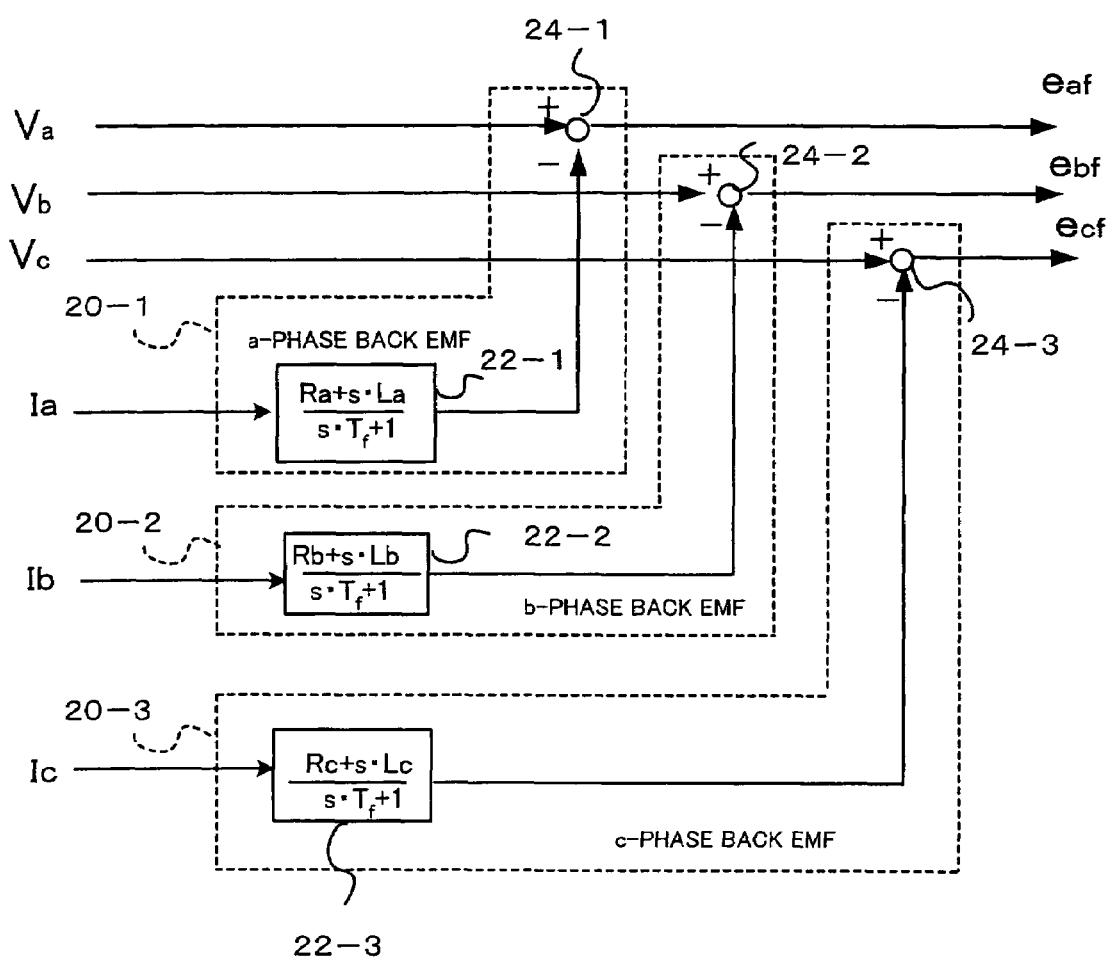
FIG. 10 is a block diagram showing an example of a structure of an apparatus for calculating a back EMF by using a voltage and a current of the motor.

Comparing the structure in the embodiment shown in FIGS. 9 and 10 with the theory of the present invention mentioned above, the back EMFs eaf, ebf and ecf are compensated by the adding sections 34-1, 34-2 and 34-3, whereby the numerical expression 12 is executed, so that the numerical expression 13, that is, the numerical expression 14 is established. Accordingly, it is possible to introduce the voltage command value Vbn from the relation "Vbn=−(Van+Vcn)" in the adding section 30-1 and the polarity inversion section 32-1, on the basis of the establishment of the numerical expression 14. In other words, in the embodiment shown in FIGS. 9 and 10, on the assumption that the respective phase back EMFs eaf, ebf and ecf are compensated, on the basis of two phase current control sections, that is, the voltage command value Van corresponding to the output of the a-phase current control section 10-1, and the voltage command value Vcn corresponding to the output of the c-phase current control section 10-2, the b-phase voltage command value Vbn corresponding to the other phase is calculated.

Embodiment-5

In the embodiment-4 mentioned above, the back EMFs eaf, ebf and ecf are calculated by using the terminal voltages Va, Vb and Vc of the motor and the motor currents Ia, Ib and Ic, however, the back EMFs eaf, ebf and ecf can be calculated by using the rotation angle and the angular velocity of the motor. A description will be given of an embodiment-5 in which the back EMFs eaf, ebf and ecf are calculated by using the rotation angle and the angular velocity of the motor, with reference to FIGS. 11 and 12.

Figure 11:
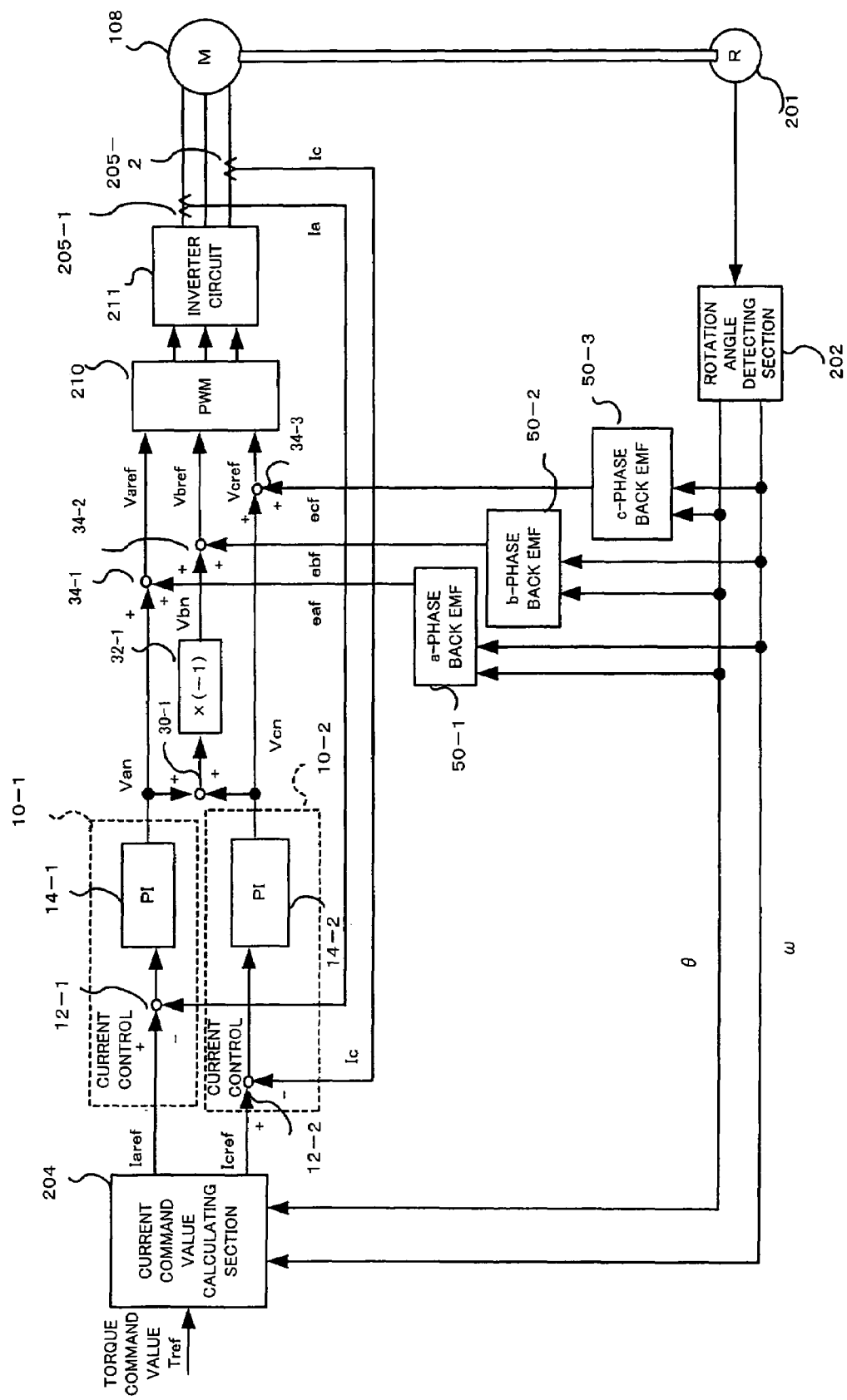
FIG. 11 is a block diagram showing an example of a structure of an embodiment-5 in accordance with the present invention.

A structure in FIG. 11 is different from the structure of the embodiment-4 shown in FIG. 9 in a point of an a-phase back EMF calculating section 50-1, a b-phase back EMF calculating section 50-2 and a c-phase back EMF calculating section 50-3 calculating the respective phase back EMFs eaf, ebf and ecf. In other words, the a-phase back EMF calculating section 50-1, the b-phase back EMF calculating section 50-2 and the c-phase back EMF calculating section 50-3 input the rotation angle θ and the angular velocity ω of the motor 108 detected by the rotation angle detecting section 202, and calculate the respective phase back EMFs eaf, ebf and ecf, respectively. Further, the respective phase back EMFs eaf, ebf and ecf output from the a-phase back EMF calculating section 50-1, the b-phase back EMF calculating section 50-2 and the c-phase back EMF calculating section 50-3 are added to the voltage command values Van, Vbn and Vcn respectively in the adding section 34-1, 34-2 and 34-3, whereby the voltage command values Varef, Vbref and Vcref are calculated. A structure and an operation of the embodiment-5 shown in FIG. 11 are the same as the structure and the operation of the embodiment-4 shown in FIG. 9 except the respective phase back EMF calculating sections 50-1, 50-2 and 50-3.

Figure 12:
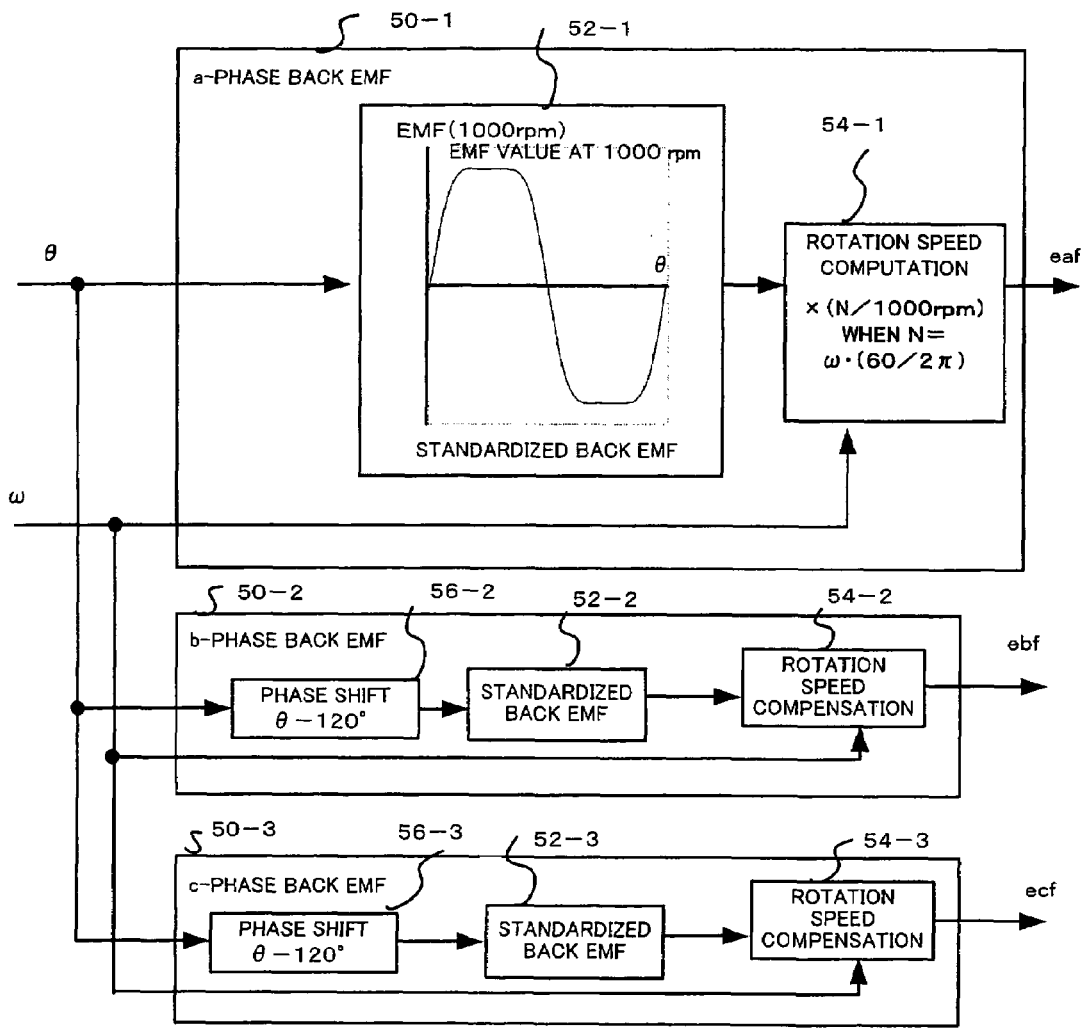
FIG. 12 is a block diagram showing an example of a structure of an apparatus for calculating a back EMF by using a rotation angle and an angular velocity of the motor.

Next, a description will be given of internal details of the a-phase back EMF calculating section 50-1, the b-phase back EMF calculating section 50-2 and the c-phase back EMF calculating section 50-3, with reference to FIG. 12.

The rotation angle θ and the angular velocity ω are inputted to the a-phase back EMF calculating section 50-1. If the rotation angle θ is inputted to the a-phase back EMF calculating section 50-1, it is first inputted to a standardized back EMF calculating section 52-1, and calculates a standardized back EMF eka on the basis of the rotation angle θ in 1000 [rpm]. In this case, in the standardized back EMF calculating section 52-1, the back EMF value eka induced so as to correspond to 1000 [rpm] with respect to the rotation angle θ is prepared as a data table. Next, the standardized back EMF eka is inputted to a rotational speed compensating section 54-1 together with the angular velocity ω. The rotational speed compensating section 54-1 calculates N/1000 corresponding to a rate with respect to a reference rotational speed 1000 [rpm] of the standardized back EMF of N [rpm] obtained by converting the angular velocity ω[rad/s] meaning the current rotational speed by rpm (in this case, N=ω×60/2π), multiplies the rate by the standardized back EMF ek so as to calculate the a-phase back EMF eaf, and calculates as an output of the rotational speed compensating section 54-1, that is, an output of the a-phase back EMF calculating section 50-1.

The rotation angle θ and the angular velocity ω are inputted to the b-phase back EMF calculating section 50-2, however, the rotation angle θ is first inputted to a phase shift section 56-2 before being inputted to the standardized back EMF calculating section 52-2. Further, a rotation angle (θ−120 degree) in the b-phase corresponding to a phase which is 120 degree delayed from the a-phase is calculated, the calculated b-phase rotation angle is inputted to the standardized back EMF calculating section 52-2, and the angular velocity ω is inputted to the rotation angle compensating section 54-2. Since the standardized back EMF calculating section 52-2 ad the rotational speed compensating section 54-2 are the same structures as the standardized back EMF calculating section 52-1 and the rotational speed compensating section 54-1 in the a-phase, the b-phase back EMF ebf is outputted by executing the same operation on the basis of the rotation angle (θ−120 degree) and the angular velocity ω.

The rotation angle θ and the angular velocity ω are inputted to the c-phase back EMF calculating section 50-3, and are first inputted to the phase shift section 56-3 before being inputted to the standardized back EMF calculating section 52-3, and the c-phase rotation angle (θ+120 degree) corresponding to the phase which is advanced with respect to the a-phase is calculated. Next, the c-phase rotation angle (θ+120 degree) is inputted to the standardized back EMF calculating section 52-3, and the angular velocity ω is inputted to the rotational speed compensating section 54-3, respectively, and the c-phase back EMF ecf is outputted in the same manner.

The respective phase back EMFs eaf, ebf and ecf can be calculated by using the rotation angle and the angular velocity mentioned above.

As described above, in accordance with the present invention, if the three-phase voltage command values Van, Vbn and Vcn are calculated by using the relational formula "Ia+Ib+Ic=0" between the three-phase back EMF compensation and the two-phase current control, three parameters Van, Vbn and Vcn are calculated with respect to three conditional expressions. Accordingly, it is possible to obtain a solution of a stable control system in which the control deviation does not remain in the control system in each of the phases, while corresponding to the individual parameter change in each of the phases, and it is possible to execute a stable control of the electric power steering apparatus.

In this case, in the description mentioned above, the current detecting means and the current control means are installed in the a-phase and the c-phase with respect to the three-phase motor, however, the same effect can be expected even in the case that the combination of two phases is constituted by a combination of the a-phase and the b-phase or a combination of the b-phase and the c-phase. Further, the same effect can be expected even in the case that the back EMF is calculated by using the line voltage in place of the phase voltage of the motor. Further, the description is given of the case that the feedback control is employed as the current control means, however, the same effect can be obtained even in the case that a control of a combined structure of the feedforward control and the disturbance observer or the like is used in addition to the feedback control.

Further, it goes without saying that the same effect can be obtained whichever the structure is made by using a hardware or a software.

In accordance with the present embodiments-4 and -5, since the two-phase current control is executed on the assumption of individually compensating the back EMFs generated in the respective phases of the three-phase motor, the current control of the remaining one phase is definitely determined, so that it is possible to individually execute the current control in each of the phases which is stable as the control system. Further, since it is possible to compensate the dispersion of the individual control amount in each of the phases per each of the phases, it is possible to do away with the deviation per each of the phases.

Further, a description will be given of the other embodiments in accordance with the present invention.

The following numerical expression 15 can be introduced by adding the left parts and the right parts in the numerical expressions 2, 3 and 4 corresponding to the voltage ad the current of the motor mentioned above, respectively.

$$Van+Vbn+Vcn=Va+Vb+Vc-3Vcn=EMFa+La\cdot(dIa/dt)+Ra\cdot Ia+EMFb+Lb\cdot(dIb/dt)+Rb\cdot Ib+EMFc+Lc\cdot(dIc/dt)+Rc\cdot Ic$$ [Numerical Expression 15]

In this case, the following numerical expressions 16 and 17 can be introduced by substituting "La=Lb=Lc=L, Ra=Rb=Rc=R and Ia+Ib+Ic=0" for the numerical expression 15.

$$Vn=\tfrac{1}{3}((Va+Vb+Vc)-(Van+Vbn+Vcn))$$ [Numerical Expression 16]

$$Vn=\tfrac{1}{3}((Va+Vb+Vc)-(EMFa+EMFb+EMFc))$$ [Numerical Expression 17]

In this case, paying attention to the numerical expression 17, it is considered to stabilize a neutral point potential Vn constant, for example, "0". It is necessary to control the respective phase voltages Va, Vb and Vc in accordance with a relation shown in numerical expression 18.

$$Va=Varef+EMFa$$

$$Vb=Vbref+EMFb$$

$$Vc=Vcref+EMFc$$ [Numerical Expression 18]

Further, numerical expression 19 is obtained by substituting the numerical expression 18 for the numerical expression 17.

$$Vn=\tfrac{1}{3}(Varef+Vbref+Vcref)$$ [Numerical expression 19]

In this case, in order to set the neutral point potential Vn to "0", it is necessary to establish the relation "Varef+Vbref+

Vcref=0". However, the total of the voltage command values Varef, Vbref and Vcref in the respective phases becomes "0" on the assumption that the dispersion is not generated in the parameter such as the inductance L, the resistance R or the like of each of the phases of the motor due to the aged change or the temperature change. Since the dispersion actually exists, and the current control means in each of the phases executes the control of compensating the error, the total of the voltage command values in the respective phases does not become "0". Accordingly, it is impossible to stabilize the neutral point potential Vn even by executing the control of maintaining the relation in the numerical expression 18.

In this case, the present invention tries to stabilize the neutral point potential Vn by reducing an average value of the voltage command values in the respective phases. Specifically, there is executed a control of maintaining a relation in numerical expression 20.

$$Va=Varef+EMFa-\frac{1}{3}(Varef+Vbref+Vcref)$$

$$Vb=Vbref+EMFb-\frac{1}{3}(Varef+Vbref+Vcref)$$

$$Vc=Vcref+EMFc-\frac{1}{3}(Varef+Vbref+Vcref)$$ [Numerical Expression 20]

Even if the relation "Varef+Vbref+Vcref=0" is not established, the relation "Vn=0" is established by substituting the numerical expression 20 for the numerical expression 17, whereby it is possible to stabilize the neutral point potential Vn.

Figure 13:
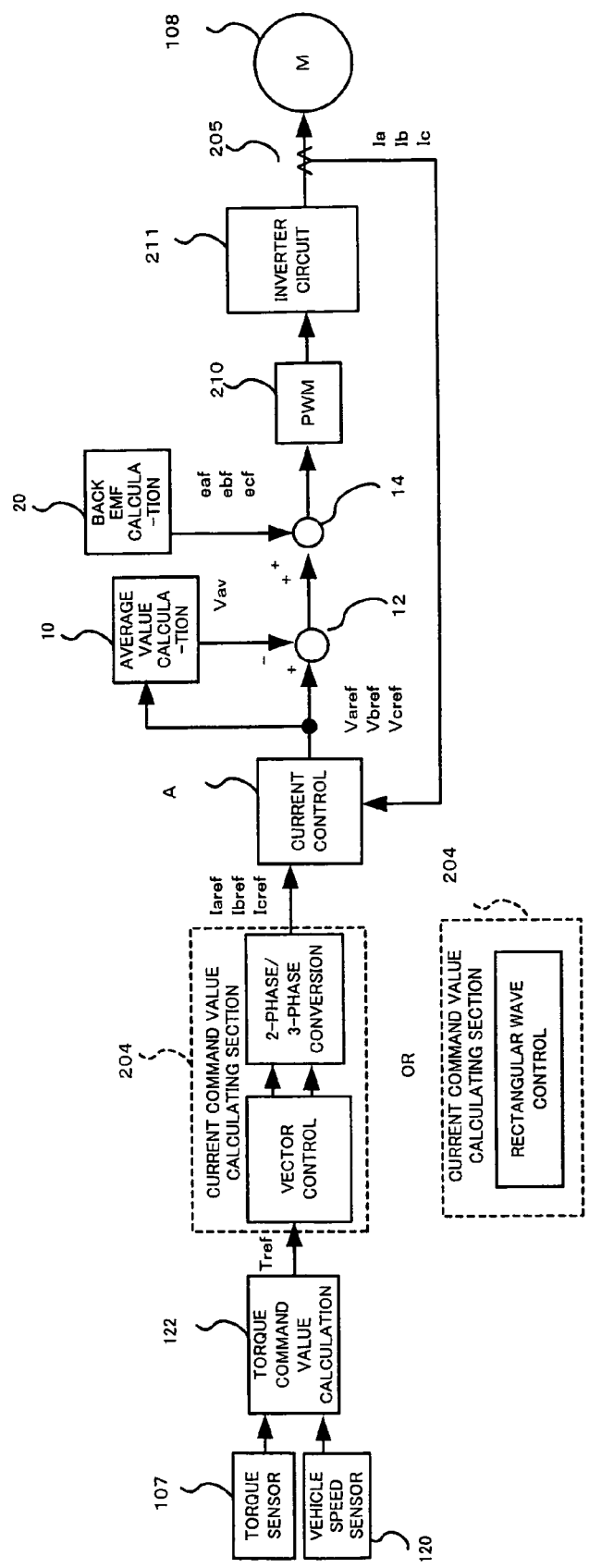
FIG. 13 is a block structural view showing a basic control system in accordance with the present invention.

FIG. 13 is a block diagram showing the theory mentioned above. The torque value detected by the torque sensor 107, and the vehicle speed value Vs detected by the vehicle speed sensor 120 are inputted to the torque command value calculating section 122, and the torque command value Tref corresponding to the result of the calculation is outputted. The current command value calculating section 204 inputs the torque command value Tref, and the current command value calculating section 204 outputs the calculated current command value in each of the phases. For example, in the three-phase motor, the current command values Iaref, Ibref and Icref are outputted. As one example of the current command value calculating section 204, there is a current command value calculating section of converting the current command values Idref and Iqref in accordance with the vector control using the d-axis and the q-axis by two-phase/three-phase, and calculating the respective phase current command values Iaref, Ibref and Icref, a current command value calculating section of calculating the respective phase current command values Iaref, Ibref and Icref in accordance with a rectangular wave current, or the like.

The respective phase currents Ia, Ib and Ic detected by the current detecting device 205 for detecting the respective phase currents Ia, Ib and Ic of the motor 108 are inputted to the current control section A serving as the current control means together with the respective phase current command values Ia, Ib and Ic, and the respective phase voltage command values Varef, Vbref and Vcref are outputted. The specific contents of the current control section A will be in detailed described in the embodiments-6 and -7 mentioned below. The respective phase voltage command values Varef, Vbref and Vcref are inputted to the average value calculating section 10, an average value "Vav=⅓(Varef+Vbref+Vcref)" is outputted, and the average value Vav is subtracted from each of the respective phase voltage command values Varef, Vbref and Vcref by the subtraction section 12.

On the other hand, the respective phase back EMFs eaf, ebf and ecf induced in the motor 108 are estimated in the back EMF calculating section 20, and the back EMFs eaf, ebf and ecf mentioned above are respectively added to (Varef−Vav), (Vbref−Vav) and (Vcref−Vav) corresponding to the output of the subtraction section 12 by the adding section 14. Further, the new respective phase voltage command values (Varef−Vav+eaf), (Vbref−Vav+ebf) and (Vcref−Vav+ecf) corresponding to the output value of the adding section 14 are inputted to the PWM control section 210, the inverter circuit 211 is PWM controlled on the basis of a PWM control signal output by the PWM control section 210, and the inverter circuit 211 supplies the current to the motor 108.

As a result of the control system mentioned above, it is possible to stabilize the neutral point potential of the motor, so that it is possible to execute the motor control having a reduced torque ripple.

Embodiment-6

A description will be given of a preferable embodiment-6 with reference to FIGS. 14 to 17A and 17B.

In the theoretical explanation mentioned above, the description is given on the assumption that the neutral point potential Vn of the motor is "0". However, in the motor control used in the electric power steering apparatus, since a battery voltage Vbat corresponding to the power source of the motor is not a power source outputting positive and negative values around "0", but a power source outputting only one of the positive and negative values, the neutral point potential Vn to be stabilized is controlled so as to be "Vbat/2" in place of "0".

On the basis of the relation of the terminal voltage "Va=Van+Vn", "Vbat/2" may be added to the numerical expression 20 mentioned above. Accordingly, a theoretical expression for controlling the neutral point potential Vn so as to maintain in "Vbat/2" in place of "0" is expressed by the following numerical expression 21.

$$Va=Varef+EMFa-\frac{1}{3}(Varef+Vbref+Vcref)+Vbat/2$$

$$Vb=Vbref+EMFb-\frac{1}{3}(Varef+Vbref+Vcref)+Vbat/2$$

$$Vc=Vcref+EMFc-\frac{1}{3}(Varef+Vbref+Vcref)+Vbat/2$$
[Numerical Expression 21]

The present embodiment-6 corresponds to an expression controlling so as to satisfy the numerical expression 21 taking into consideration the battery power source of the electric power steering apparatus. Further, in the present embodiment-6, a description will be given of the case that the feedback control is used as an embodiment of the current control portion A.

First, the rotation angle θ and the angular velocity ω of the motor 108 are detected by the resolver 201 corresponding to one example of the position detecting device detecting the rotation angle θ of the motor 108, and the rotation angle detecting device 202 constituted by the RDC (resolver-digital conversion) circuit processing the output signal of the resolver 201 or the like. Further, the torque command value Tref, the rotation angle θ and the angular velocity ω are inputted to the current command value calculating section 204, and the respective phase current command values Iaref, Ibref and Icref are outputted from the current command value calculating section 204.

In the present embodiment-6, the current control section A is constituted by the feedback control system. The respective phase currents Ia, Ib and Ic of the motor 108 are detected in the following manner. The currents Ia and Ic are first detected by the current detecting devices 205-1 and 205-2, and the current Ib is calculated as the current "Ib=−(Ia+Ic)" on the basis of the relation "Ia+Ib+Ic=0" by the adding section 205-3 and the polarity inversion section 205-4 while having the currents Ia and Ic as an input.

The detected respective phase currents Ia, Ib and Ic of the motor 108 are feedbacked to the subtraction sections 150-1, 150-2 and 150-3 in the current control section A, respectively, and the currents Ia, Ib and Ic are respectively subtracted from the respective phase current command values Iaref, Ibref and Icref. The deviations (Iaref–Ia), (Ibref–Ib) and (Icref–Ic) corresponding to the output of the subtraction sections 150-1, 150-2 and 150-3 are respectively inputted to the proportional integral (PI) control sections 152-1, 152-2 and 152-3, so that the respective phase voltage command values Varef, Vbref and Vcref are outputted.

Next, the respective phase voltage command values Varef, Vbref and Vcref are inputted to the average value calculating section 10, and the average value "Vav=⅓(Varef+Vbref+Vcref)" is calculated. The respective phase voltage command values Varef, Vbref and Vcref, and the average value Vav are respectively inputted to the subtraction sections 12-1, 12-2 and 12-3. (Varef–Vav), (Vbref–Vav) and (Vcref–Vav) are outputted from the subtraction sections 12-1, 12-2 and 12-3 as the result of the subtraction.

On the other hand, the respective phase back EMFs eaf, ebf and ecf are estimated in the a-phase back EMF calculating section 20-1, the b-phase back EMF calculating section 20-2 and the c-phase back EMF calculating section 20-3, respectively. First, the a-phase motor terminal voltage Va, the b-phase motor terminal voltage Vb and the c-phase motor terminal voltage Vc are respectively detected in the voltage detecting devices 220-1, 220-2 and 220-3. Further, the current Ia and the voltage Va are inputted to the a-phase back EMF calculating section 20-1, so that the back EMF eaf is outputted. In the same manner, the current Ib and the voltage Vb are inputted to the b-phase back EMF calculating section 20-2, so that the back EMF ebf is outputted, and the current Ic and the voltage Vc are inputted to the c-phase back EMF calculating section 20-3, so that the back EMF ecf is outputted.

A description will be given of specific contents of the a-phase back EMF calculating section 20-1, the b-phase back EMF calculating section 20-2 and the c-phase back EMF calculating section 20-3 with reference to FIG. 15.

It is calculated on the basis of an expression "V=EMF+(R+s·L)·I" showing a relation between the voltage and the current of the motor. The back EMF "EMF" is calculated by modifying the expression to "EMF=V–(R+s·L)·I". Specifically, in FIG. 15, the a-phase current Ia is inputted to the transfer function section 22-1 (the transfer function =(Ra+s·La)/(s·Tf+1)). In this case, the denominator of the transfer function means a low-pass filter (LPF) for absorbing the noise in the current detection. Further, since the output of the transfer function section 22-1 is subtracted from the terminal voltage Va of the motor in the subtraction section 24-1, the a-phase back EMF eaf is estimated as "eaf=Va–(Ra+s·La)·Ia/(s·Tf+1)".

In the same manner, the b-phase back EMF ebf is inputted to the transfer function section 22-2, the output thereof and the b-phase terminal voltage Vb are inputted to the subtraction section 24-2, and the back EMF ebf is outputted. In the same manner, the c-phase back EMF ecf is inputted to the transfer function section 22-3, the output thereof and the c-phase terminal voltage Vc are inputted to the subtraction section 24-3, and the back EMF ecf is outputted.

Figure 14:
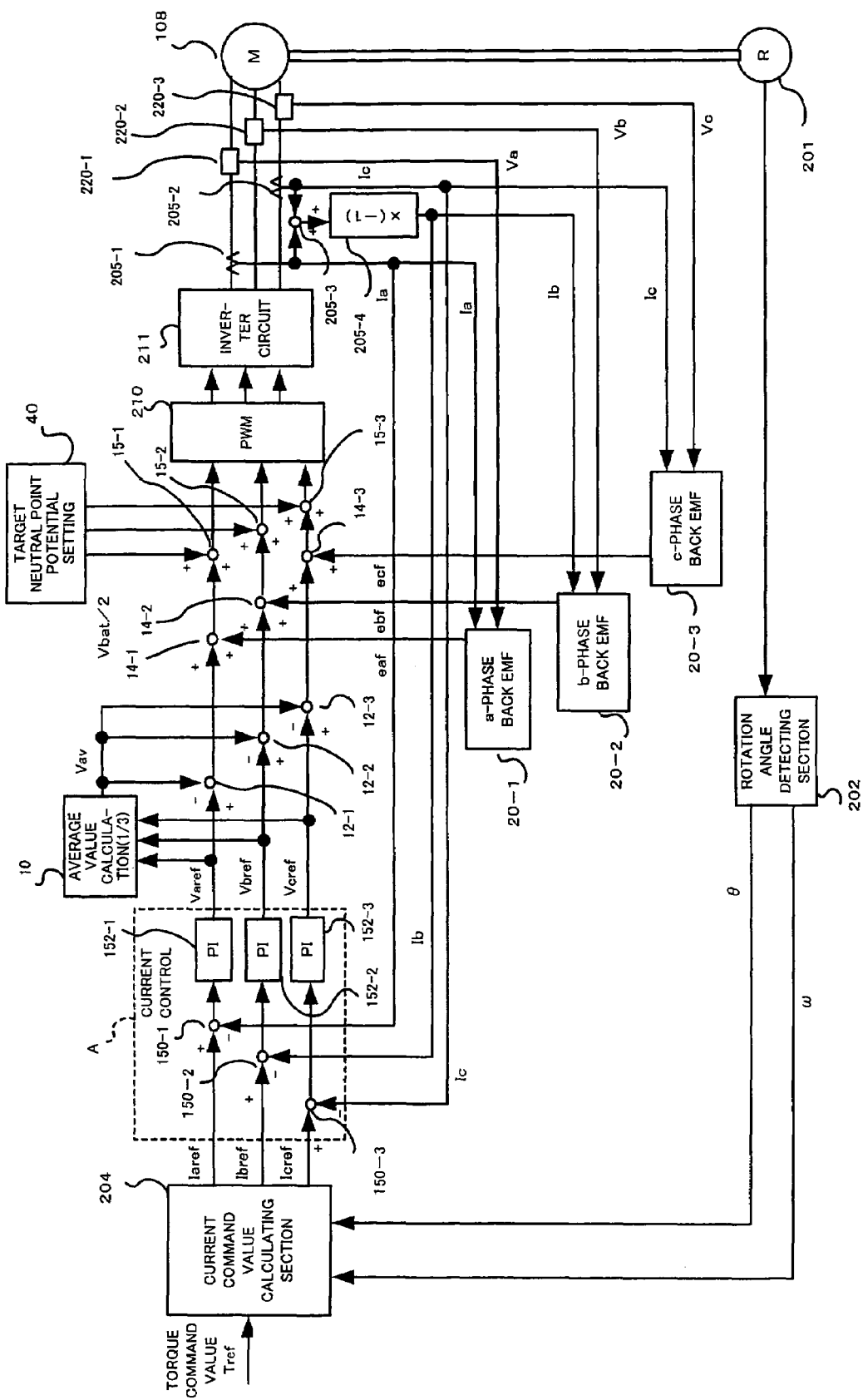
FIG. 14 is a block structural view showing an embodiment-6 in the case that a current control system is constituted by a feedback control.
Figure 15:
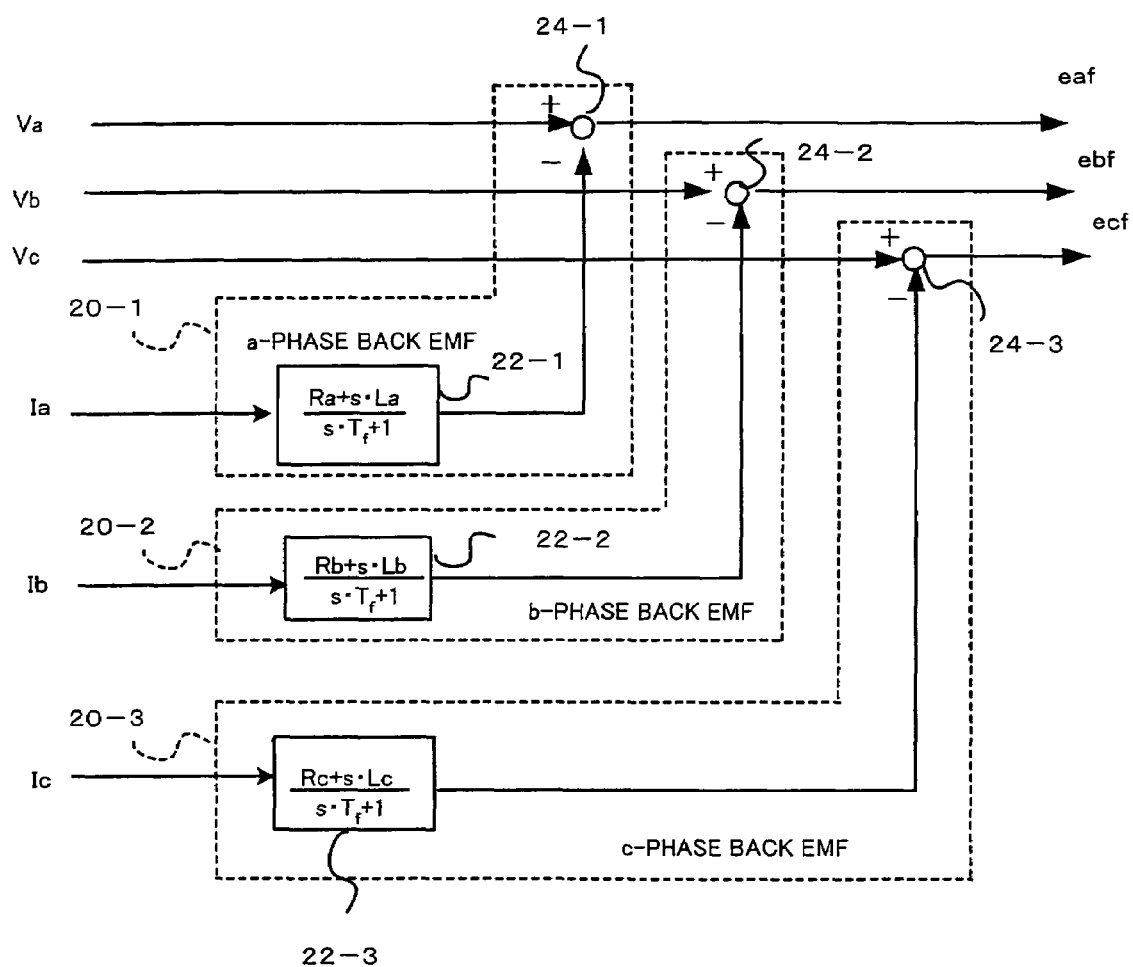
FIG. 15 is a view showing a counter electromotive voltage calculation using a terminal voltage and a current of the motor.

Since the description is given of the one embodiment of the specific procedure of the respective phase back EMF estimations with reference to FIG. 15, a description will be returned again to the control block diagram in FIG. 14. In the subtraction section 14-1, the back EMF eaf corresponding to the output of the a-phase back EMF calculating section 20-1 is added to "Varef–Vav" corresponding to the output of the subtraction section 12-1, and the new a-phase voltage command value "Vare–Vav+eaf" is outputted. In the same manner, with respect to the b-phase, in the subtraction section 14-2, the b-phase back EMF ebf estimated by the b-phase back EMF calculating section 20-2 is added to "Vbref–Vav" corresponding to the output of the subtraction section 14-2, and the new b-phase voltage command value "Vbref–Vav+ebf" is outputted. In the same manner, with respect to the c-phase, in the subtraction section 14-3, the c-phase back EMF ecf estimated by the c-phase back EMF calculating section 20-3 is added to "Vcref–Vav" corresponding to the output of the subtraction section 14-3, and the new c-phase voltage command value "Vcref–Vav+ecf" is outputted.

Further, "Vbat/2" corresponding to a half of the battery voltage value shown by a target neutral point potential setting section 40 is added to (Varef–Vav+eaf), (Vbref–Vav+ebf) and (Vcref–Vav+ecf) corresponding to the new respective voltage command values, in the addition sections 15-1, 15-2 and 15-3, and (Varef–Vav+eaf+Vbat/2), (Vbref–Vav+ebf+Vbat/2) and (Vcref–Vav+ecf+Vbat/2) are outputted. The respective outputs of the addition sections 15-1, 15-2 and 15-3 are inputted to the PWM control section 210 and converted into the PWM control signals, and the inverter circuit 211 supplies the current to the motor 108.

In other words, the final new respective phase voltage command values corresponding to the input of the PWM control section 210 become (Varef–Vav+eaf+Vbat/2), (Vbref–Vav+ebf+Vbat/2) and (Vcref–Vav+ecf+Vbat/2), and the values shown by the numerical expression 21 are inputted to the PWM control section 210. As a result, the neutral point potential Vn of the motor 108 is controlled so as to be maintained at Vbat/2 corresponding to the half value of the battery voltage value Vbat. In other words, in the motor control, the control is executed in such a manner that the neutral point potential becomes stable and the torque ripple and the sound of the motor can be suppressed.

The description is given above of the embodiment in which the back EMF of the motor is calculated on the basis of the terminal voltage and the current of the motor, however, the back EMF can be estimated on the basis of the rotation angle $\theta$ and the angular velocity $\omega$ of the motor corresponding to the motor position. A description will be given of an embodiment thereof with reference to FIG. 16.

The rotation angle $\theta$ and the angular velocity $\omega$ outputted from the rotation angle detecting device 202 are inputted to the a-phase back EMF calculating section 30-1. Since the back EMF induced by the rotation angle $\theta$ showing the rotor position of the motor is determined by the characteristic of the motor in the case that rotational speed N [rpm] calculated by the angular velocity $\omega$[rad/s], N=$\omega$×60/2$\pi$, is set to 1000 [rpm], it is possible to estimate the standardized back EMF eafk at 1000 [rpm] by inputting to the standardized back EMF calculating section 32-1 prepared as a table. Next, in order to compensate to the back EMF taking the rotational speed N [rpm] into consideration with respect to the standardized back EMF eafk at 1000 [rpm], the a-phase back EMF "eaf=eafk× (N/1000)" is calculated by converting the detected angular velocity $\omega$ into the rotational speed N and inputting the standardized back EMF eafk to the rotation speed compensating portion 34-1 multiplying the relative speed N/1000 on the basis of 1000 [rpm] of the rotational speed N.

Next, in order to calculate the b-phase back EMF ebf, the rotation angle $\theta$ and the angular velocity $\omega$ of the motor corresponding to the motor position are inputted to the b-phase back EMF calculating section 30-2. Since the rotation angle of the b-phase is delayed at 120 degree in phase with respect to the a phase, the input rotation angle θ is inputted to the phase shift section 36-2 in which the phase is delayed at 120 degree, and is outputted as the rotation angle (θ−120 degree) corresponding to the b-phase rotation angle. Thereafter, it is inputted to the standardized back EMF calculating section 32-2 in the same manner as the a-phase, and an output ebfk thereof is inputted to the rotation speed compensating section 34-2 so as to be outputted as the b-phase back EMF ebf. In the calculation of the c-phase back EMF ecf, since the c-phase rotation angle is advanced at 120 degree in phase with respect to the a-phase, the input rotation angle θ is inputted to the phase shift section 36-3 advancing the phase at 120 degree, and is outputted as the rotation angle (θ+120 degree) corresponding to the c-phase rotation angle. Thereafter, it is inputted to the standardized back EMF calculating section 32-3 in the same manner as the a phase, and an output ecfk thereof is inputted to the rotation speed compensating section 34-3 so as to be outputted as the c-phase back EMF ecf.

The respective phase back EMFs can be estimated on the basis of the terminal voltage and the current of the motor, and can be also estimated on the basis of the rotation angle and the angular velocity of the motor. It is possible to select in correspondence to the performance of the installed detecting device while taking a precision, a detecting speed or the like into consideration. Further, the back EMF can be detected by the other methods than the method mentioned above, and it goes without saying that the back EMF detected thereby can be applied to the present embodiment-6.

A description will be given of details of an embodiment in which the proportional integral control section 152 in FIG. 14 is digital processed specifically, with reference to FIGS. 17A and 17B.

Figure 17A:
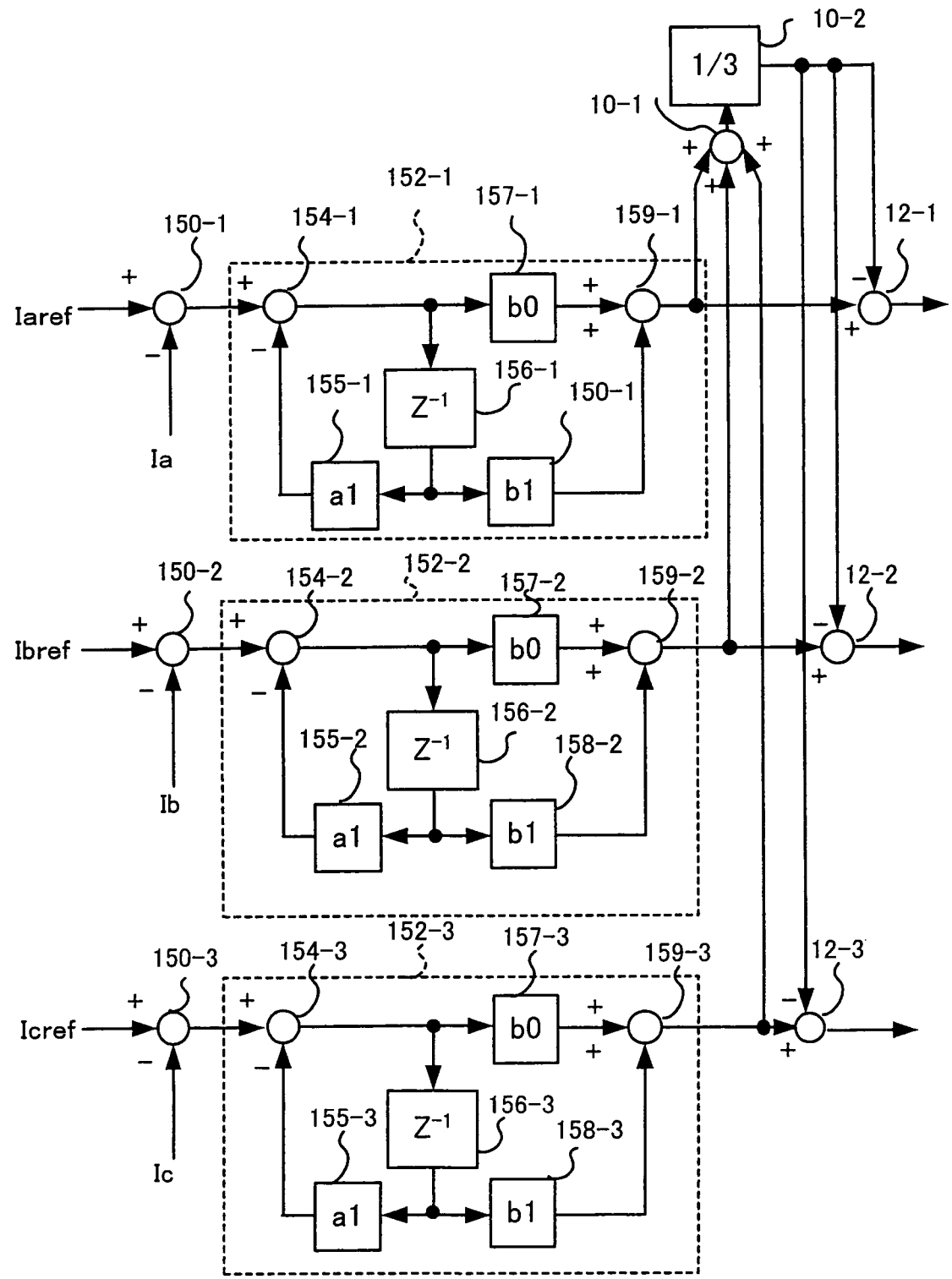
FIGS. 17A and 17B are block structural view showing a digital processing system of a proportional integral control.
Figure 17B:
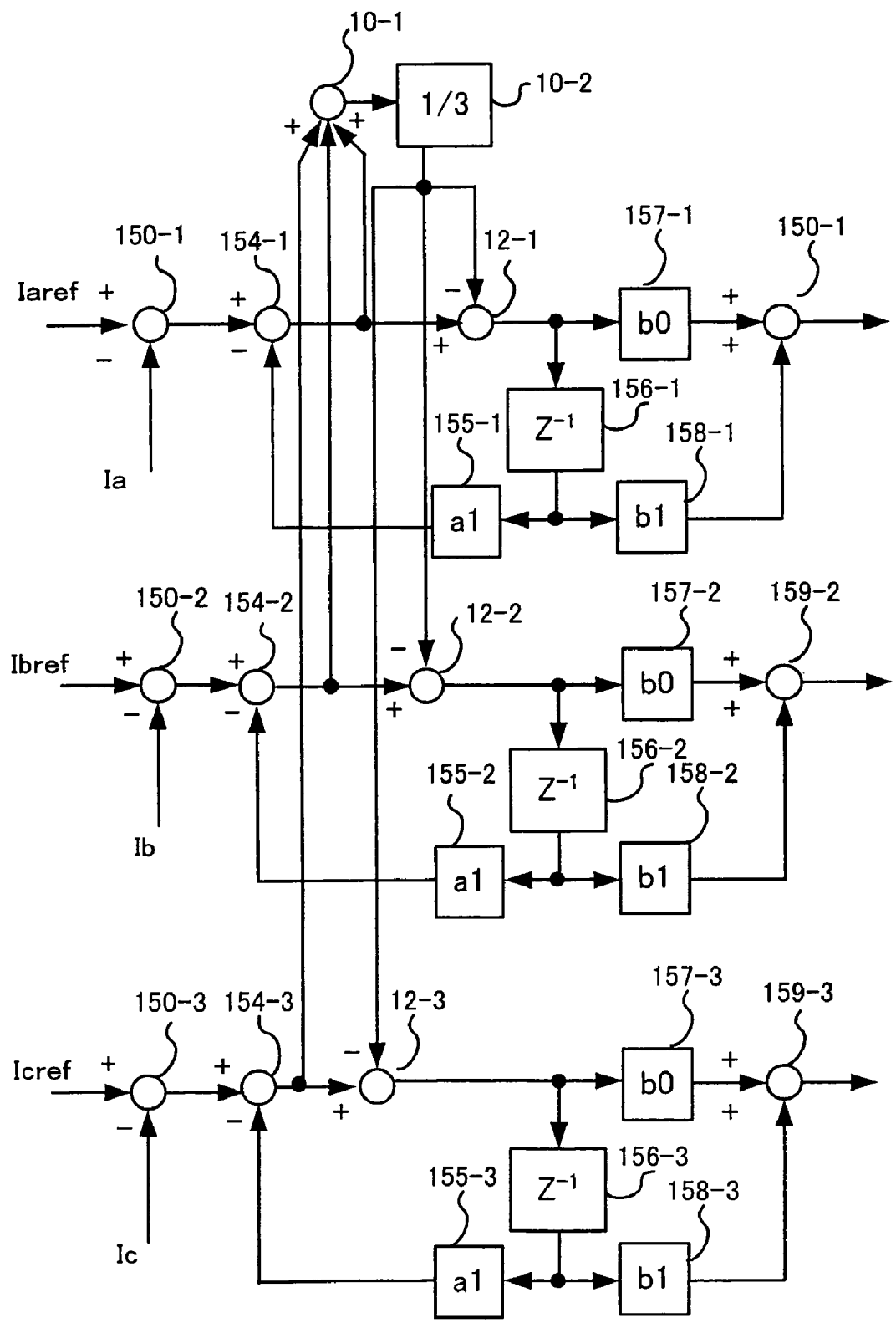

FIG. 17A is a block diagram in the case that the apparatus shown in FIG. 14 is digital processed as it is. As a means for calculating an average value of the respective phase voltage command values and subtracting the average value from the respective phase voltage command values, the structure in FIG. 17A is made such as to calculate the voltage command values Varef, Vbref and Vcref corresponding to the outputs of the PI control sections 152-1, 152-2 and 152-3, thereafter calculate the average value Vav via the calculating section 10-1 and the dividing section 10-2, and subtract the average value Vav from the respective phase voltage command values Varef, Vbref and Vcref in the subtraction sections 12-1, 12-2 and 12-3. If the digital process is executed in accordance with this procedure, an overflow is undesirably generated in the process of the process or the value is undesirably attached to the limiter. Accordingly, as shown in FIG. 17B, the average value is calculated in the middle of the proportional integral process, and the process of subtracting the average value from the respective phase values is calculated in the middle of the proportional integral process.

In other words, for example, the average value of the respective output values of the a-phase subtraction section 154-1, the b-phase subtraction section 154-2 and the c-phase subtraction section 154-3 is executed in the adding section 10-1 and the dividing section 10-2, and the process of subtracting the average from the outputs of the subtraction sections 154-1, 154-2 and 154-3 is executed by the subtraction sections 12-1, 12-2 and 12-3 just after the execution. In other words, in connection with the output values of the subtraction sections 12-1, 12-2 and 12-3, the output values of the subtraction sections 12-1, 12-2 and 12-3 in FIG. 17B are smaller as an absolute value in comparison with the output values of the subtraction sections 12-1, 12-2 and 12-3 in FIG. 17A, and there is a small possibility that the overflow is generated, and the value is attached to the limiter. Accordingly, the structure in FIG. 17B is preferable as the embodiment in accordance with the present invention.

Embodiment-7

Figure 18:
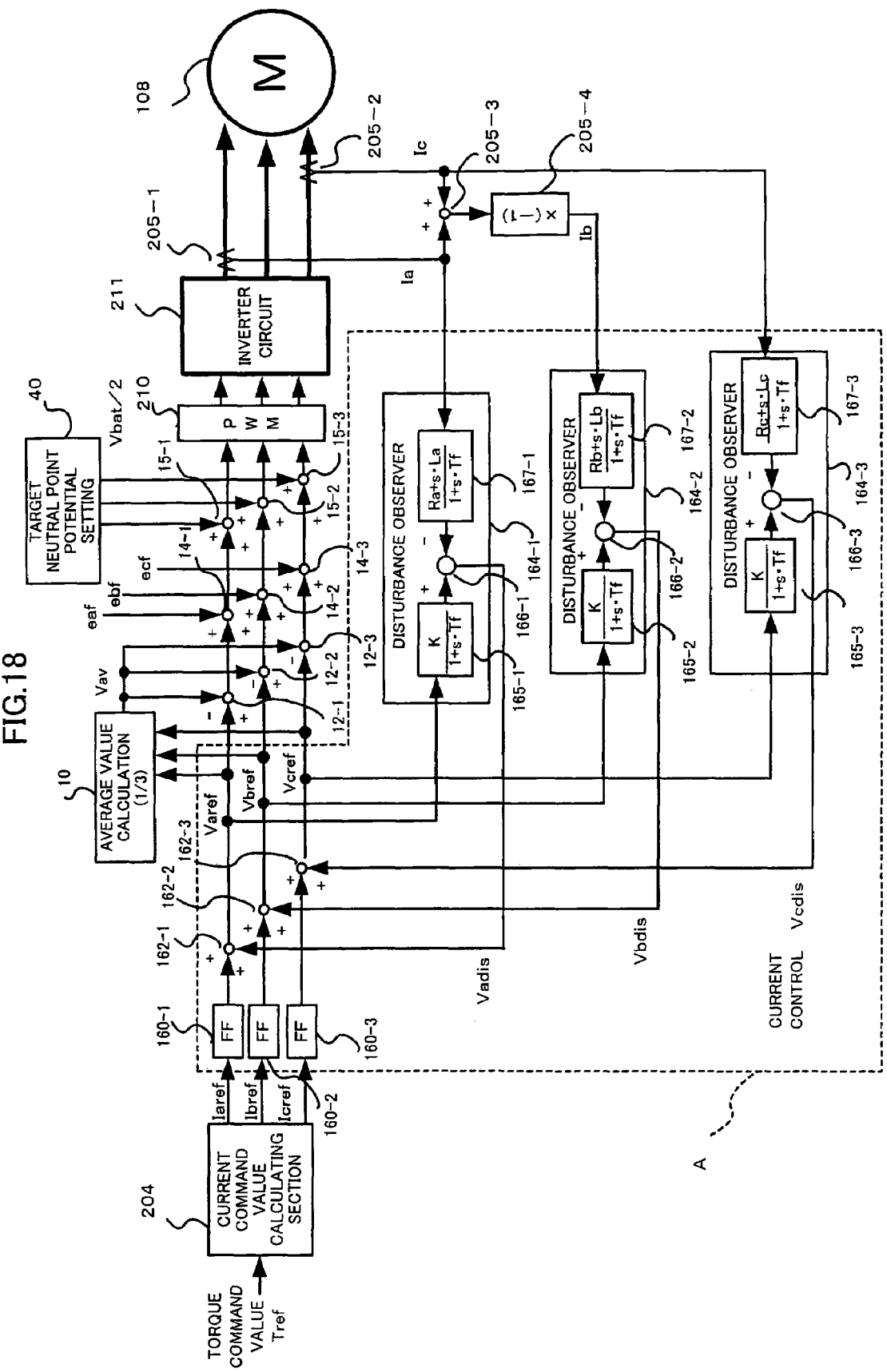
FIG. 18 is a block structural view showing an embodiment-7 in the case that the current control system is constituted by a feed forward control and a disturbance observer.

The embodiment-6 mentioned above corresponds to the case that the current control section A is constituted by the feedback control, however, the present invention can be applied to the case that the current control section A is constituted by a combination of the feedforward control and the disturbance observer. A description will be given of an embodiment-7 in which the present invention is applied to the combination of the feedforward control and the disturbance observer, with reference to FIG. 18. Since a different portion from the embodiment of the feedback control mentioned above exists only in the current control section A, and the calculating procedure of the respective phase back EMFs eaf, ebf and ecf and the like are the same as those of the embodiment-6 of the feedback control, the description thereof will be omitted, and a description will be given of only the different current control section A.

The respective phase voltage command values Varef, Vbref and Vcref can be determined by adding outputs of respective disturbance observer calculating sections 164-1, 164-2 and 164-3 to outputs of feedforward (FF) control sections 160-1, 160-2 and 160-3 having the respective current command values Iaref, Ibref and Icref as an input by adding sections 162-1, 162-2 and 162-3.

For example, a current Ia detected by a current detecting device 205-1 and the voltage command value Varef are inputted to the a-phase disturbance observer calculating section 164-1. The current Ia is inputted to a transfer function section 167-1 in the disturbance observer calculating section 164-1. The transfer function is constituted by "$(Ra+s \cdot La)/(1+s \cdot Tf)$", a first order lag function in the denominator expresses an LPF for absorbing the noise at a time of detecting the current. On the other hand, a transfer function of the transfer function section 165-1 having the voltage command value Varef as the input is constituted by "$K/1+s \cdot Tf$". "$1+s \cdot Tf$" in the denominator is provided for balancing between the primary lag of a transfer function section 167-1 and the time lag. The subtraction between the output of the transfer function section 165-1 and the output of the transfer function section 167-1 is executed by a subtraction section 166-1, and the output thereof becomes an output Vadis of the disturbance observer calculating section 164-1.

In the same manner, a current Ib corresponding to an output of a polarity inversion section 205-4 and the voltage command value Vbref are inputted to the b-phase disturbance observer calculating section 164-2. In the same manner as the a phase, the they are respectively inputted to a transfer function section 167-2 and the transfer function section 165-2, the outputs thereof are inputted to a subtraction section 166-2, and the output of the subtraction section 166-2 is outputted as an output Vbdis of the disturbance observer calculating section 164-2.

In the same manner, a current Ic corresponding to an output of a current detecting device 205-2 and the voltage command value Vcref are inputted to the c-phase disturbance observer calculating section 164-3. In the same manner as the a-phase, the they are respectively inputted to a transfer function section 167-3 and the transfer function section 165-3, the outputs thereof are inputted to a subtraction section 166-3, and the output of the subtraction section 166-3 is outputted as an output Vcdis of the disturbance observer calculating section 164-3.

The disturbance value Vadis, Vbdis and Vcdis corresponding to the outputs of the disturbance observer calculating sections 164-1, 164-2 and 164-3, and the outputs of the FF control sections 160-1, 160-2 and 160-3 having the current command values Iaref, Ibref and Icref are respectively added by the adding sections 162-1, 162-2 and 162-3, and the voltage command values Varef, Vbref and Vcref are calculated.

With respect to the respective phase voltage command values determined in the manner mentioned above, the average values Vav thereof are calculated by the average value calculating section 10, the average value Vav is subtracted from the respective phase voltage command values by the subtraction sections 12-1, 12-2 and 12-3, respectively, and the respective phase back EMFs eaf, ebf and ecf are respectively added to the outputs by the adding sections 14-1, 14-2 and 14-3. New respective phase voltage command values corresponding to the result obtained by adding the target value Vbat/2 shown by a target neutral point potential setting section 40 for forming the neutral point potential while taking the battery voltage into consideration by the adding section 15-1, 15-2 and 15-3 become (Varef−Vav+eaf+Vbat/2), (Vbref−Vav+ebf+Vbat/2) and (Vcref−Vav+ecf+Vbat/2), and become values satisfying the numerical expression 21.

As a result, even in the case that the current control section A is constituted by the combination of the feedforward control and the disturbance observer, it is possible to execute the control of maintaining the neutral point potential of the motor constant which corresponds to the effect of the present invention, whereby it is possible to execute the motor control of suppressing the torque ripple of the motor. In this case, at a time of applying the present invention, the structure of the current control section A is not limited to the combination of the feedback control, the feedforward control and the disturbance observer mentioned above.

As described above, in accordance with the present embodiments-6 and -7, it is possible to uniformly stabilize the neutral point potential of the motor without using any special sensor and without specially increasing the load of the calculating process of the CPU or the like. Therefore, it is possible to execute the motor control which can suppress the torque ripple and the sound of the motor.

Further, the neutral point exists in the case of the Y-wire connection, but does not exist in the case of the Δ-wire connection actually, in the case of the three-phase motor. However, even if the present invention is applied to the motor control of the Δ-wire connection, it is possible to achieve an effect of stabilizing a potential of a virtual neutral point in the case that three terminals of the Δ-wire connection are assumed as three terminals of the Y-wire connection and converted equivalently between Δ and Y, and it is possible to suppress an interference between the respective phase currents. Therefore, even in the Δ-wire connection motor in which the neutral point does not actually exist, it is possible to execute the motor control which can suppress the torque ripple.

In this case, the description is given of the three-phase motor in the description of the embodiments mentioned above, however, the present invention can be applied to a polyphase motor having three or more phases. Further, since it is possible to stabilize the neutral point potential so as to suppress the torque ripple in the motor control, by using the present invention, it is possible to execute a handle operation having a reduced noise and a good feeling, in the electric power steering apparatus using the motor.

Since the neutral point potential of the motor can be expressed as the respective phase average values obtained by subtracting the total of the respective phase back EMFs from the total of the respective phase terminal voltages, it is possible to stabilize the neutral point potential by first compensating the average value of the respective phase voltage command values with respect to the respective phase voltage command values, and further compensating the respective phase EMFs. As a result, it is possible to provide the control apparatus of the electric power steering apparatus which is provided with the motor control having the reduced torque ripple and noise and can execute the handle operation having the good feeling.

The invention claimed is:

1. A control apparatus of an electric power steering apparatus structured such as to apply a steering assist force generated by a n-phase (in this case, "n" being an integral number equal to or more than 3) motor to a steering system of a vehicle, wherein the control apparatus comprises at least (n−1) numbers of current detecting means for detecting a current Im (in this case, "m" being 1, 2, . . . , n) in each of phases of said motor, a current command value calculating means for outputting a current command value Imref (in this case, "m" being 1, 2, . . . , n) in each of the phases, and n numbers of current control means, and the control apparatus executes a current control of each of the phases by said current control means having said current command value Imref in each of the phases and said current Im in each of the phases as an input.

2. A control apparatus of an electric power steering apparatus as claimed in claim 1, wherein said current control means is constituted by a feedforward control means and a disturbance observer.

3. A control apparatus of a electric power steering apparatus as claimed in claim 1 or 2, wherein in the case that said n-phase motor is constituted by a three-phase motor, a wire connection of a winding of the motor is constituted by a Y-wire connection or a Δ-wire connection.

4. A control apparatus of an electric power steering apparatus structured such as to apply a steering assist force generated by a three-phase motor to a steering system of a vehicle, wherein the control apparatus comprises three respective-phase back EMF calculating means for calculating back EMFs e1, e2 and e3 in respective phases of said three-phase motor, and two respective-phase current control means, and the control apparatus calculates a command value ref3 in one remaining phase from command values ref1 and ref2 corresponding to outputs of said two current control means, and adds said back EMFs e1, e2 and e3 to said command values ref1, ref2 and ref3.

5. A control apparatus of an electric power steering apparatus as claimed in claim 4, wherein the current detecting means for detecting the current of said three-phase motor is installed in phases in which said respective phase current control means are provided.

6. A control apparatus of an electric power steering apparatus as claimed in claim 4 or 5, wherein said respective phase back EMF calculating means is structured such as to calculate said respective phase back EMFs e1, e2 and e3 on the basis of respective phase terminal voltages and respective phase currents of said three-phase motor.

7. A control apparatus of an electric power steering apparatus as claimed in claim 4 or 5, wherein said respective phase back EMF calculating means is structured such as to calculate said respective phase back EMFs e1, e2 and e3 on the basis of a rotation angle and an angular velocity of said three-phase motor.

8. A control apparatus of an electric power steering apparatus comprising:
- a polyphase motor applying a steering assist force to a steering system of a vehicle;
- a current command value calculating means for calculating a current command value in each of phases applied to said motor;
- a current detecting means for detecting a current in each of the phases of said motor; and
- a current control means for calculating a voltage command value in each of the phases on the basis of said current command value and said detected current,
- wherein the control apparatus is provided with a back EMF calculating means for estimating a back EMF induced in said motor, subtracts an average value of said voltage command value in each of the phases from said voltage command value in each of the phases, and controls on the basis of a new voltage command value in each of the phases obtained by adding said back EMF in each of the phases.

9. A control apparatus of an electric power steering apparatus as claimed in claim 8, wherein said current control means is constituted by a feedback control means.

10. A control apparatus of an electric power steering apparatus as claimed in claim 8, wherein said current control means is constituted by a feed forward control means and a disturbance observer.

11. A control apparatus of an electric power steering apparatus as claimed in any one of claims 8 to 10, wherein said back EMF is estimated from a terminal voltage and a current of said motor.

12. A control apparatus of an electric power steering apparatus as claimed in any one of claims 8 to 10, wherein said back EMF is estimated from an angular velocity and a motor position of said motor.

13. A control apparatus of an electric power steering apparatus as claimed in any one of claims 8 to 12, wherein said motor is constituted by a three-phase motor, and a wire connecting type is constituted by a Y-wire connection or a Δ-wire connection.

* * * * *